United States Patent
Johnson et al.

(10) Patent No.: US 12,362,082 B2
(45) Date of Patent: Jul. 15, 2025

(54) COERCIVITY-ENHANCED IRON NITRIDE NANOPARTICLES WITH HIGH SATURATION MAGNETIZATION

(71) Applicant: NIRON MAGNETICS, INC., Minneapolis, MN (US)

(72) Inventors: Francis Johnson, Minneapolis, MN (US); Yiming Wu, Shoreview, MN (US); John Michael Larson, Northfield, MN (US); L. Anderson Blackburn, San Carlos, CA (US)

(73) Assignee: NIRON MAGNETICS, INC., Minneapolis, MN (US)

( * ) Notice: Subject to any disclaimer, the term of this patent is extended or adjusted under 35 U.S.C. 154(b) by 640 days.

(21) Appl. No.: 17/611,680

(22) PCT Filed: May 22, 2020

(86) PCT No.: PCT/US2020/034331
§ 371 (c)(1),
(2) Date: Nov. 16, 2021

(87) PCT Pub. No.: WO2020/237192
PCT Pub. Date: Nov. 26, 2020

(65) Prior Publication Data
US 2022/0215991 A1    Jul. 7, 2022

Related U.S. Application Data

(60) Provisional application No. 62/851,190, filed on May 22, 2019.

(51) Int. Cl.
| | | |
|---|---|---|
| H01F 1/047 | (2006.01) | |
| B22F 1/054 | (2022.01) | |
| B22F 1/16 | (2022.01) | |
| C04B 35/58 | (2006.01) | |
| C04B 35/628 | (2006.01) | |
| C23C 8/26 | (2006.01) | |

(52) U.S. Cl.
CPC .............. *H01F 1/047* (2013.01); *B22F 1/054* (2022.01); *B22F 1/16* (2022.01); *C04B 35/58042* (2013.01); *C04B 35/62813* (2013.01); *C04B 35/62884* (2013.01); *C04B 35/62897* (2013.01); *C23C 8/26* (2013.01); *B22F 2301/35* (2013.01); *B22F 2302/25* (2013.01); *B22F 2304/05* (2013.01); *C04B 2235/3217* (2013.01); *C04B 2235/3272* (2013.01); *C04B 2235/3852* (2013.01); *C04B 2235/405* (2013.01); *C04B 2235/5445* (2013.01); *C04B 2235/5454* (2013.01); *C04B 2235/85* (2013.01)

(58) Field of Classification Search
CPC .. H01F 1/047; B22F 1/16; B22F 1/054; B22F 2301/35; B22F 2302/25; B22F 2304/05; C23C 8/26; C04B 35/58042; C04B 35/62813; C04B 35/62884; C04B 35/62897; C04B 2235/3217; C04B 2235/3272; C04B 2235/3852; C04B 2235/405; C04B 2235/5445; C04B 2235/5454; C04B 2235/85
See application file for complete search history.

(56) References Cited

U.S. PATENT DOCUMENTS

| | | | |
|---|---|---|---|
| 2006/0177660 A1 | 8/2006 | Kumar et al. | |
| 2012/0012778 A1* | 1/2012 | Tilley | C01B 32/914 252/62.55 |
| 2014/0001398 A1 | 1/2014 | Takahashi et al. | |
| 2015/0380149 A1 | 12/2015 | Nakamura et al. | |
| 2016/0086700 A1* | 3/2016 | Suetsuna | H01F 1/0063 252/62.56 |
| 2016/0379741 A1 | 12/2016 | Allard, Jr. et al. | |
| 2017/0186521 A1 | 6/2017 | Nakamura et al. | |
| 2017/0243680 A1 | 8/2017 | Wang et al. | |
| 2020/0038951 A1* | 2/2020 | Wang | B22F 9/20 |
| 2021/0265086 A1 | 8/2021 | Johnson et al. | |

FOREIGN PATENT DOCUMENTS

| | | | |
|---|---|---|---|
| CN | 106062907 A | 10/2016 | |
| CN | 107408435 A | 11/2017 | |
| EP | 2760033 A1 | 7/2014 | |
| EP | 4107765 A1 | 12/2022 | |
| JP | 2012-149326 A | 8/2012 | |
| JP | 2013-080922 A | 5/2013 | |
| JP | 2017-228656 A | 12/2017 | |
| WO | WO 2014/122993 A1 | 8/2014 | |
| WO | WO 2016/122971 A1 | 8/2016 | |
| WO | WO-2018067926 A1 * | 4/2018 | ............ B22F 1/0018 |
| WO | WO 2021/168438 A1 | 8/2021 | |

OTHER PUBLICATIONS

International Search Report from PCT/US2020/034331 as prepared by the ISA/US; mailed Oct. 8, 2020.
International Patent Application No. PCT/US2020/034331; Int'l Preliminary Report on Patentability; dated Dec. 2, 2021; 7 pages.

* cited by examiner

Primary Examiner — Jane L Stanley
(74) Attorney, Agent, or Firm — BakerHostetler

(57) ABSTRACT

Iron nitride nanoparticles and magnet materials made from iron nitride nanoparticles are described. The iron nitride nanoparticles have a core and a shell morphology. The shell is configured to provide a means to nitride the core. The magnetic materials are characterized as having an Msat greater than about 160 emu/g and a coercivity greater than about 700 Oe.

14 Claims, 51 Drawing Sheets

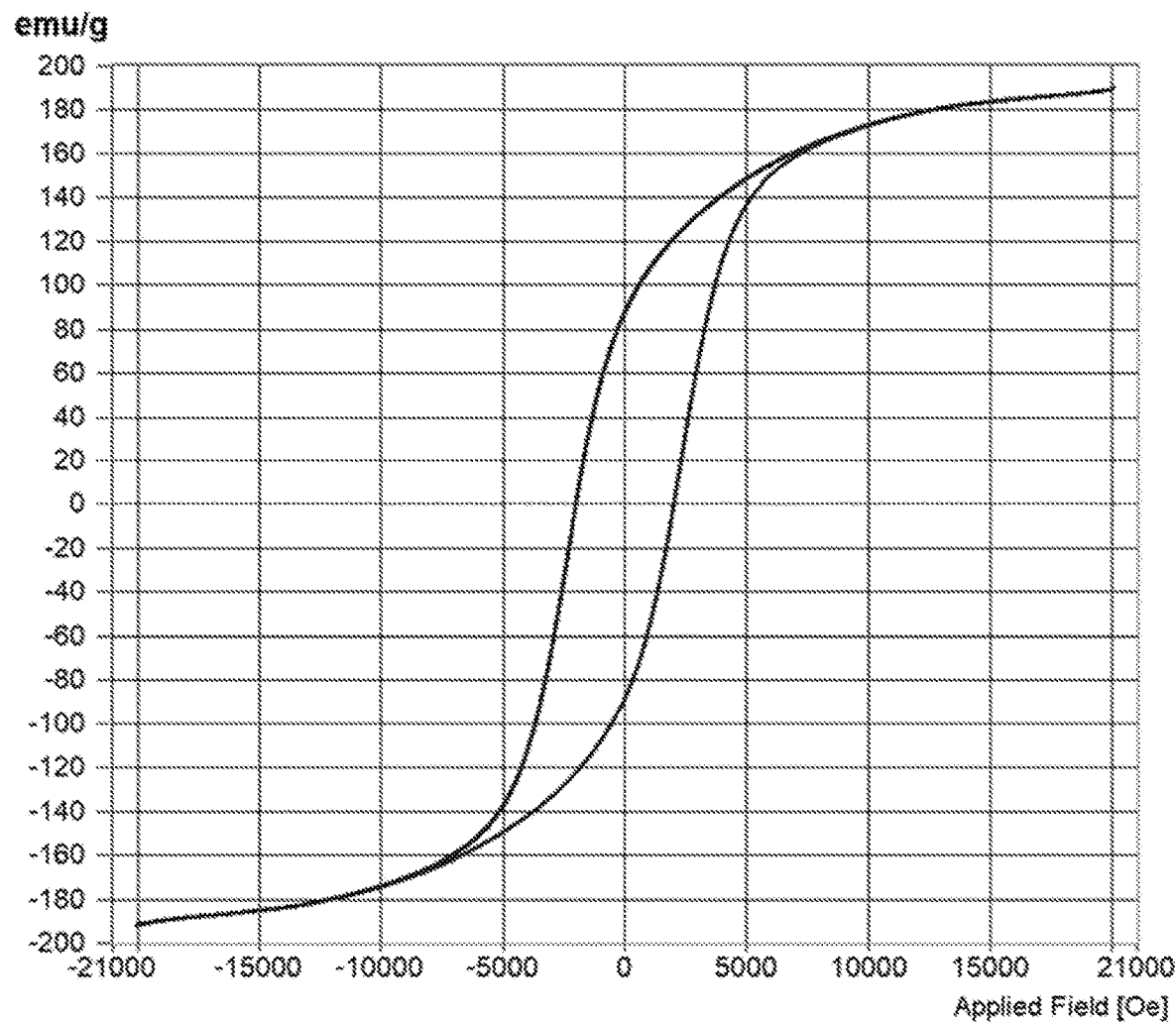
Figure 1.1 Hysteresis loop of aluminum oxide coated iron nitride nanoparticles produced in Example 1.

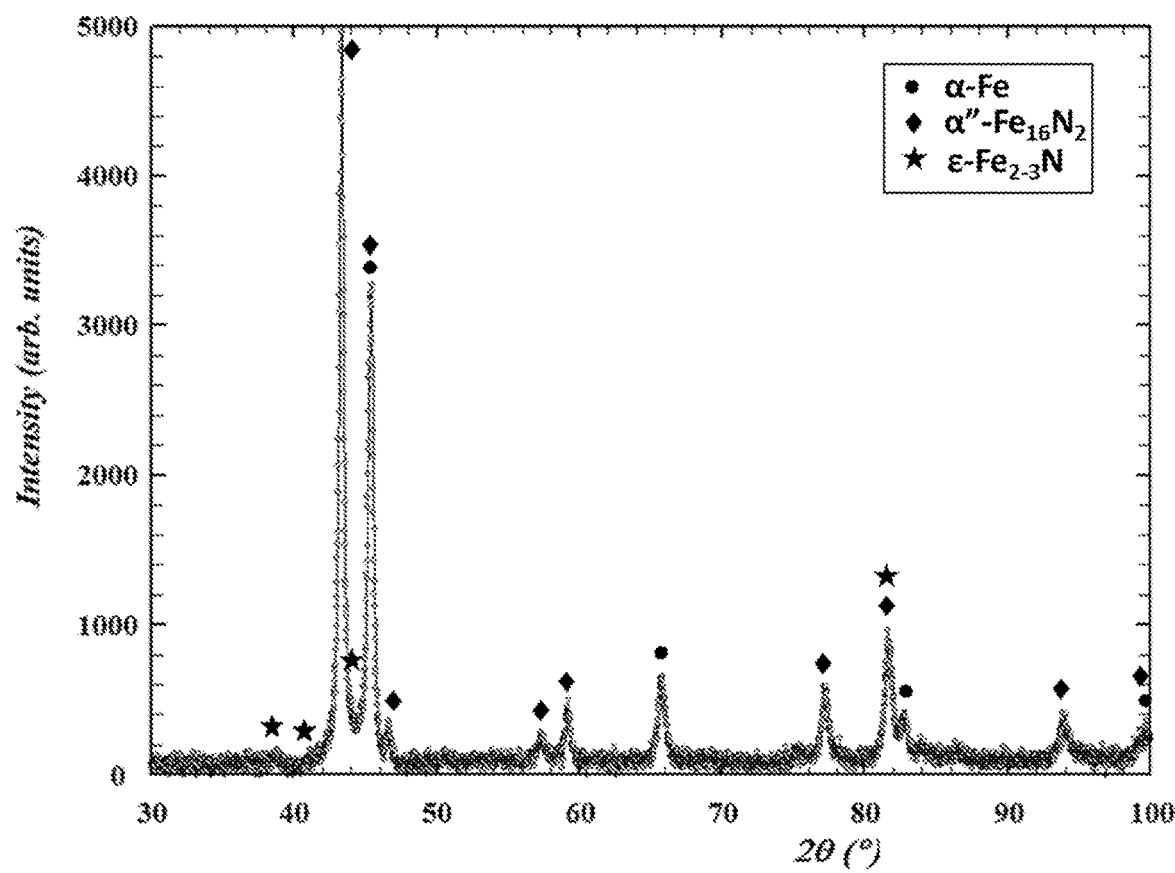
Figure 1.2 X-Ray Diffraction pattern of aluminum oxide coated iron nitride nanoparticles produced in Example 1.

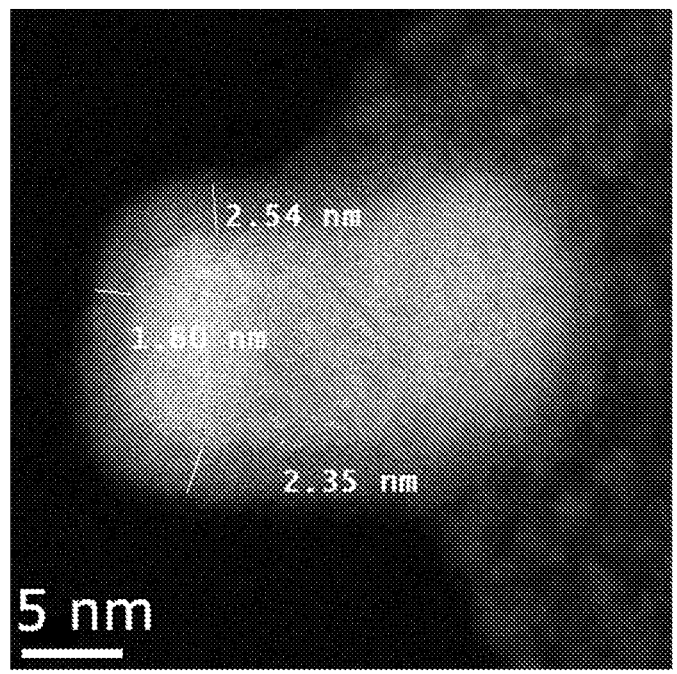
Figure 1.3 Transmission electron microscope image measuring the thickness of an aluminum oxide coating on an iron nitride nanoparticle produced in Example 1.

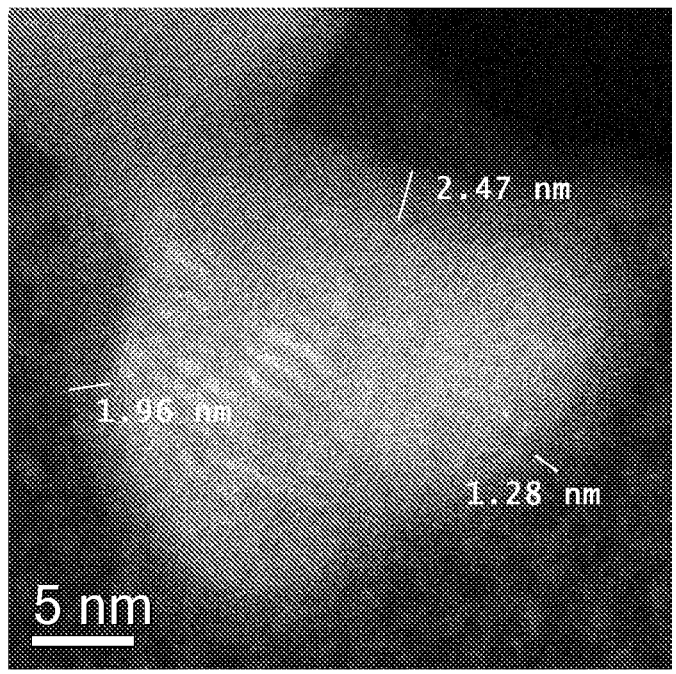
Figure 1.4 Transmission electron microscope image measuring the thickness of an aluminum oxide coating on an iron nitride nanoparticle produced in Example 1.

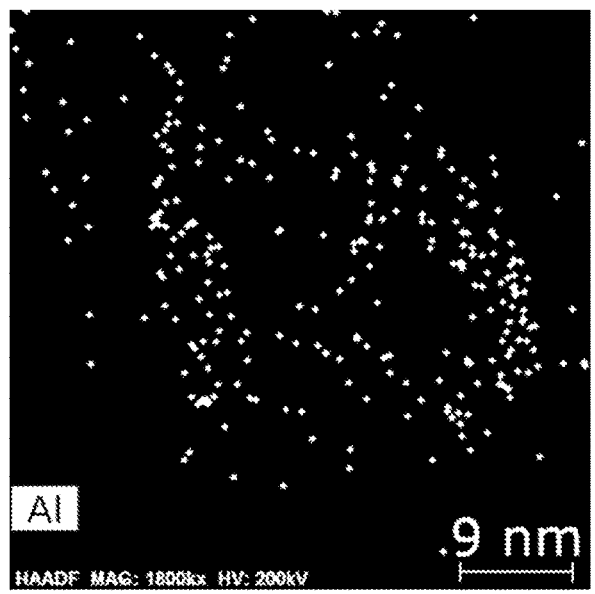
Figure 1.5 Elemental map of Aluminum localized to the surface of an aluminum oxide coated iron nitride nanoparticle from Example 1.

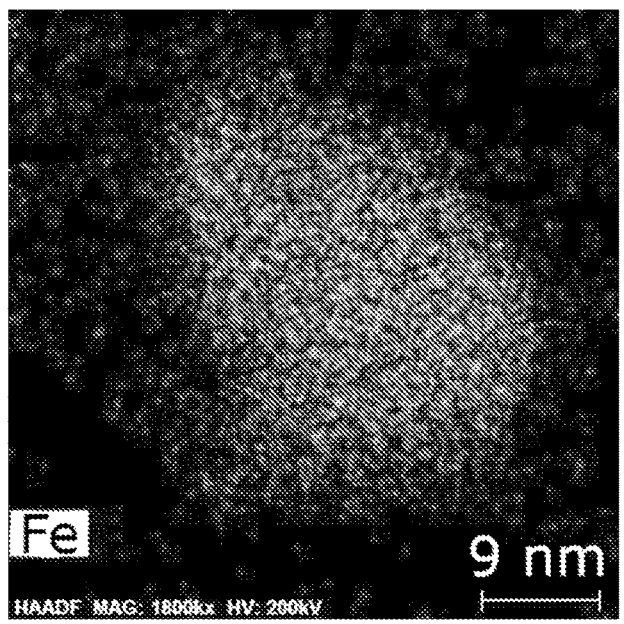
Figure 1.6 Elemental map of Iron distributed through the volume of an aluminum oxide coated iron nitride nanoparticle from Example 1.

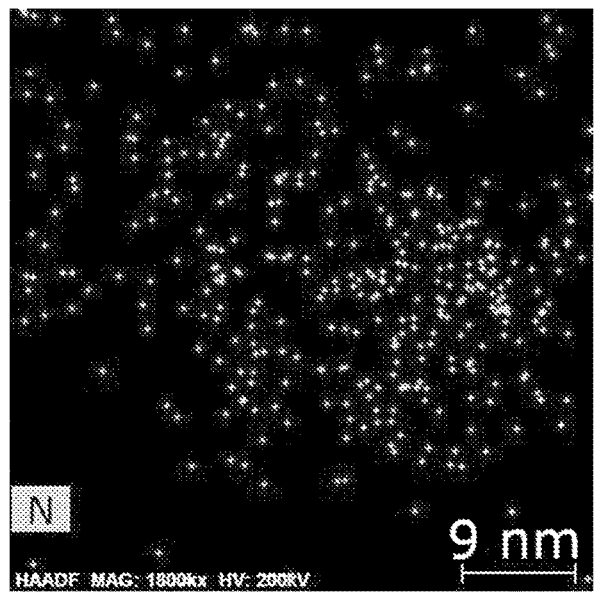
Figure 1.7 Elemental map of Nitrogen distributed through the volume of an aluminum oxide coated iron nitride nanoparticle from Example 1.

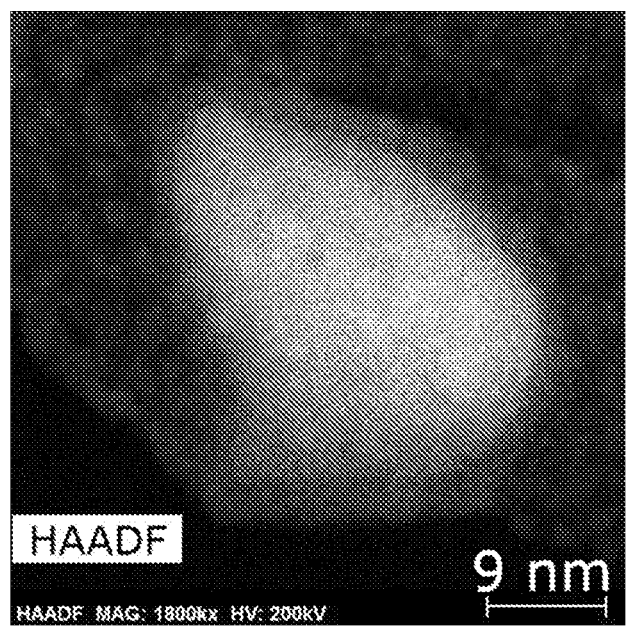
Figure 1.8. Image of aluminum oxide coated iron nitride nanoparticle from which Al, Fe, and N elemental maps were collected in Example 1.

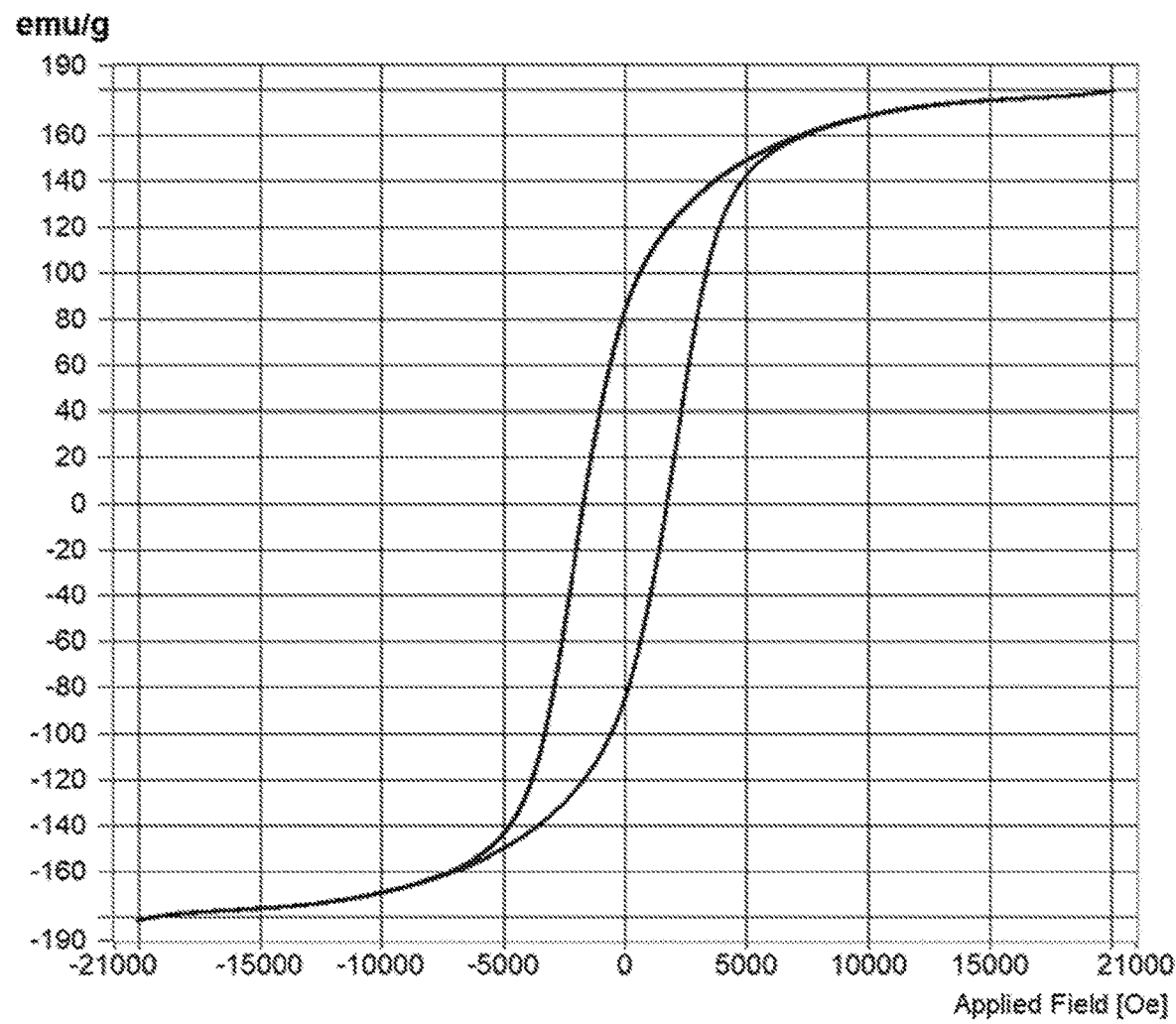
Figure 1.9 Hysteresis loop of isotropic compacted magnet made by uniaxially pressing aluminum oxide coated iron nitride nanoparticles produced in Example 1 to a pressure of 10 MPa.

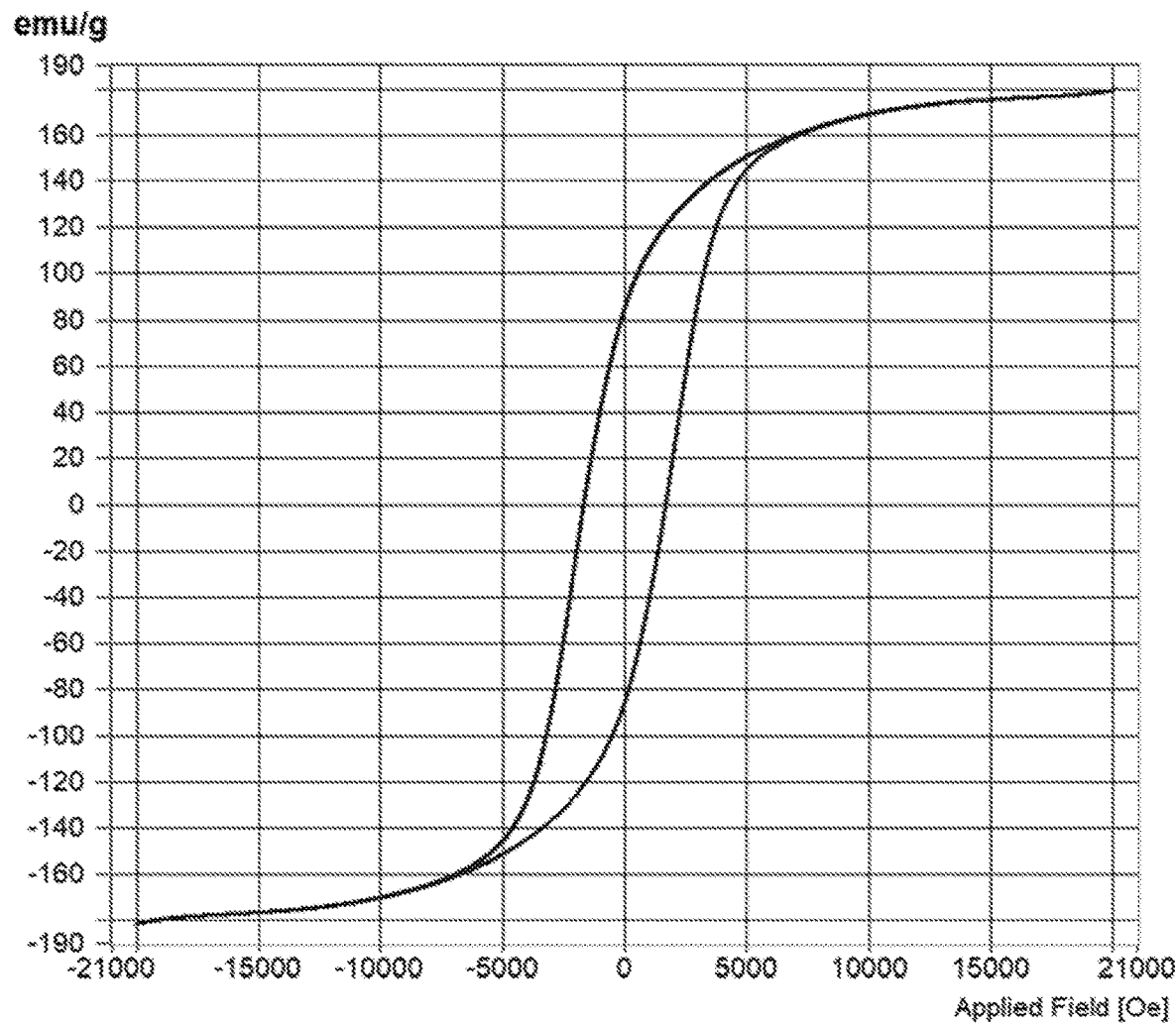
Figure 1.10 Hysteresis loop of isotropic compacted magnet made by uniaxially pressing aluminum oxide coated iron nitride nanoparticles produced in Example 1 to a pressure of 12 MPa.

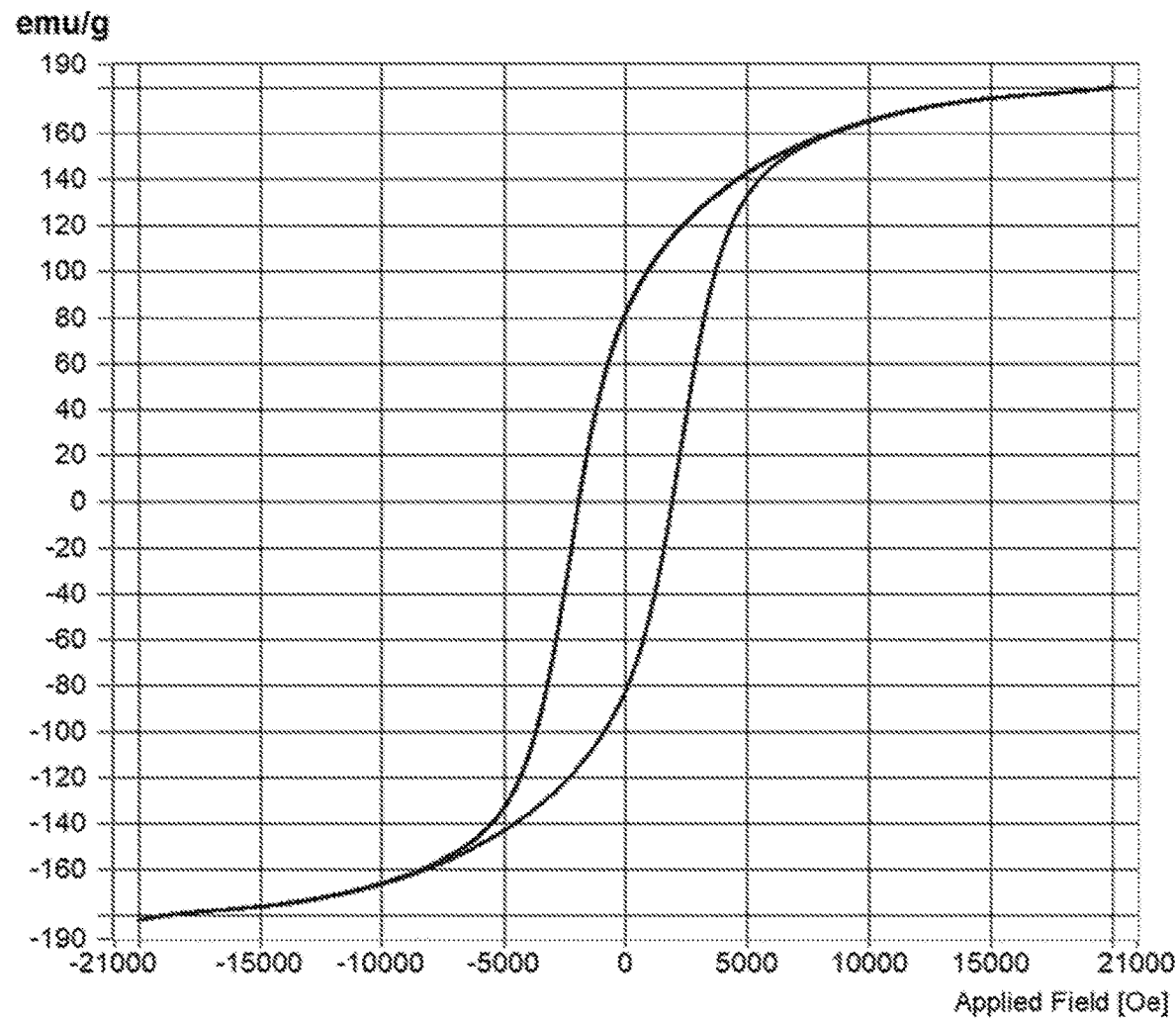
Figure 2.1 Hysteresis loop of aluminum oxide coated iron nitride nanoparticles produced in Example 2.

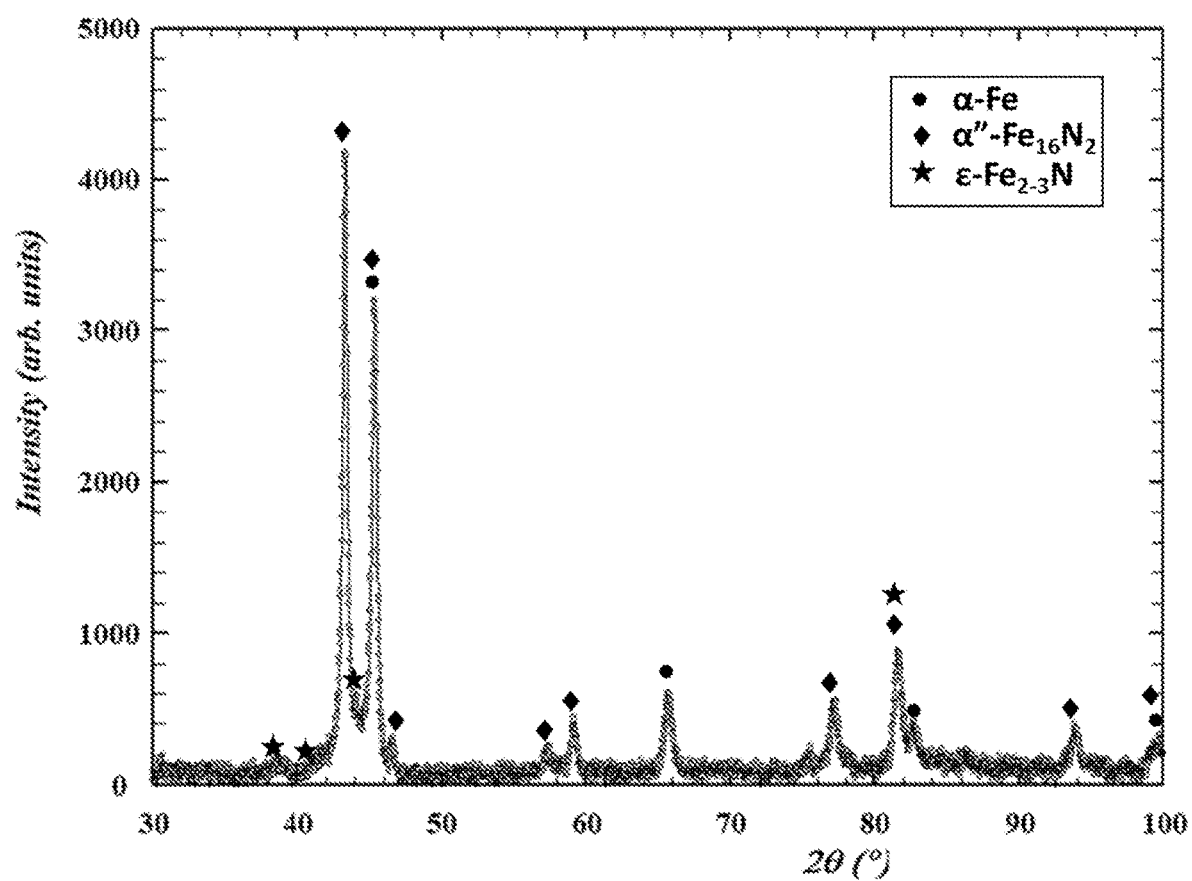
Figure 2.2 X-Ray Diffraction pattern of aluminum oxide coated iron nitride nanoparticles produced in Example 2.

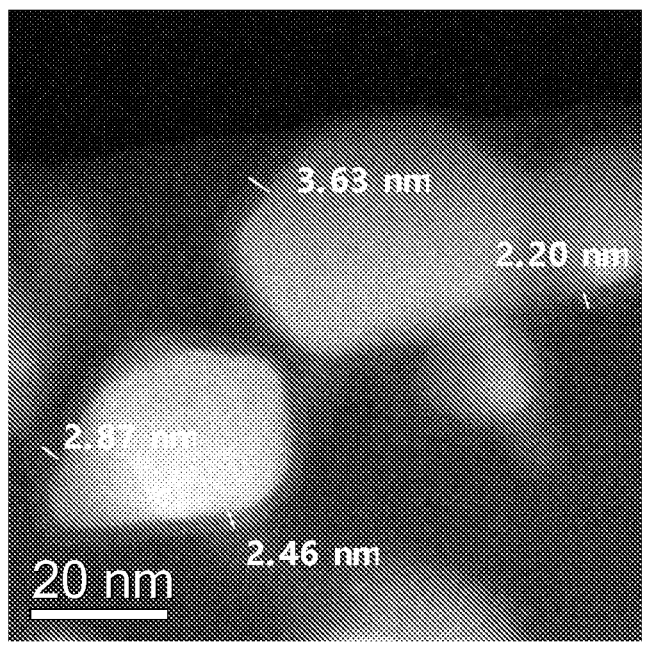
Figure 2.3 Transmission electron microscope image measuring the thickness of an aluminum oxide coating on an iron nitride nanoparticle produced in Example 2.

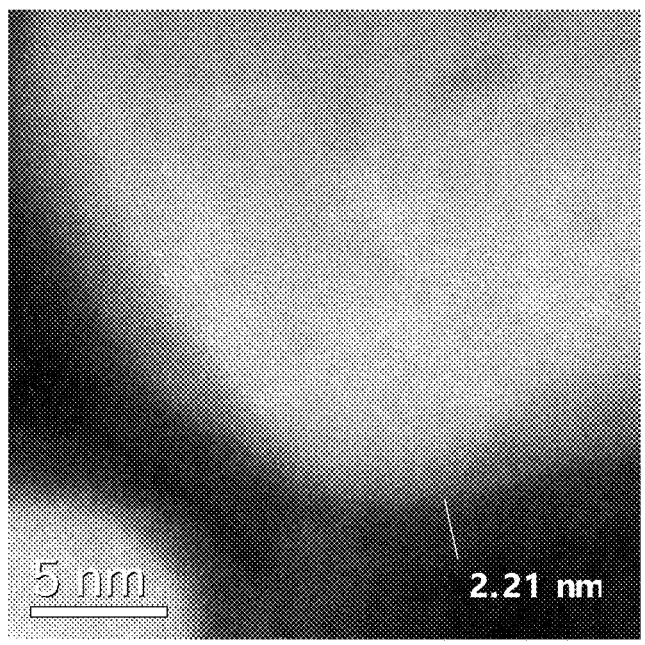
Figure 2.4 Transmission electron microscope image measuring the thickness of an aluminum oxide coating on an iron nitride nanoparticle produced in Example 2.

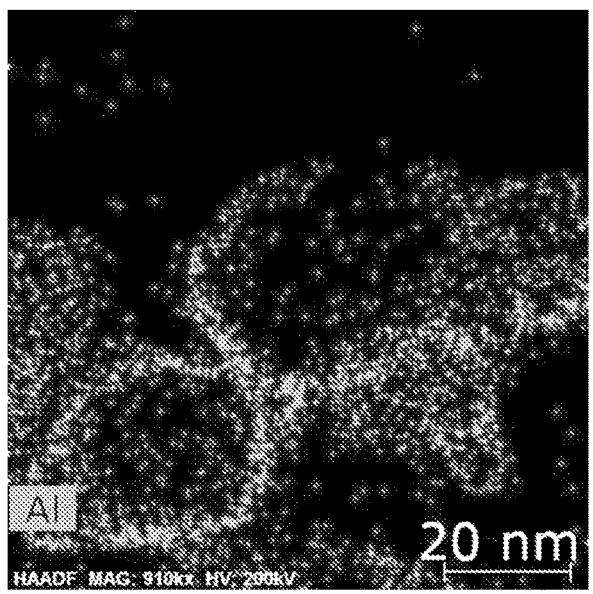
Figure 2.5 Elemental map of Aluminum localized to the surface of an aluminum oxide coated iron nitride nanoparticle from Example 2.

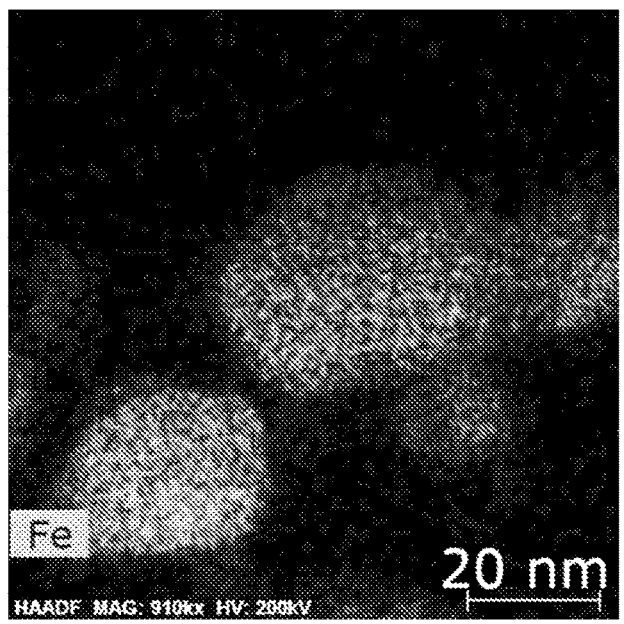
Figure 2.6 Elemental map of Iron distributed through the volume of an aluminum oxide coated iron nitride nanoparticle from Example 2.

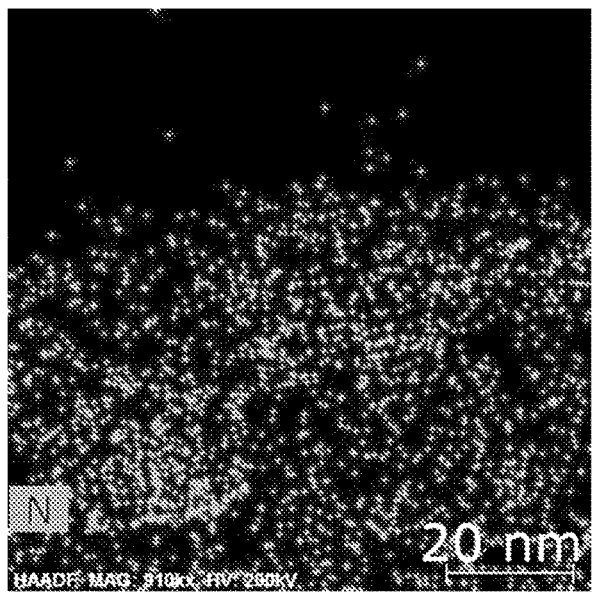
Figure 2.7 Elemental map of Nitrogen distributed through the volume of an aluminum oxide coated iron nitride nanoparticle from Example 2.

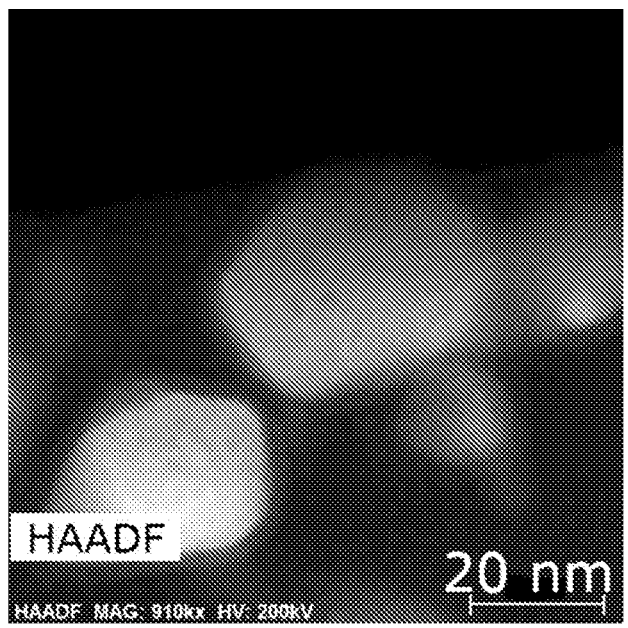
Figure 2.8. Image of aluminum oxide coated iron nitride nanoparticle from which Al, Fe, and N elemental maps were collected in Example 2.

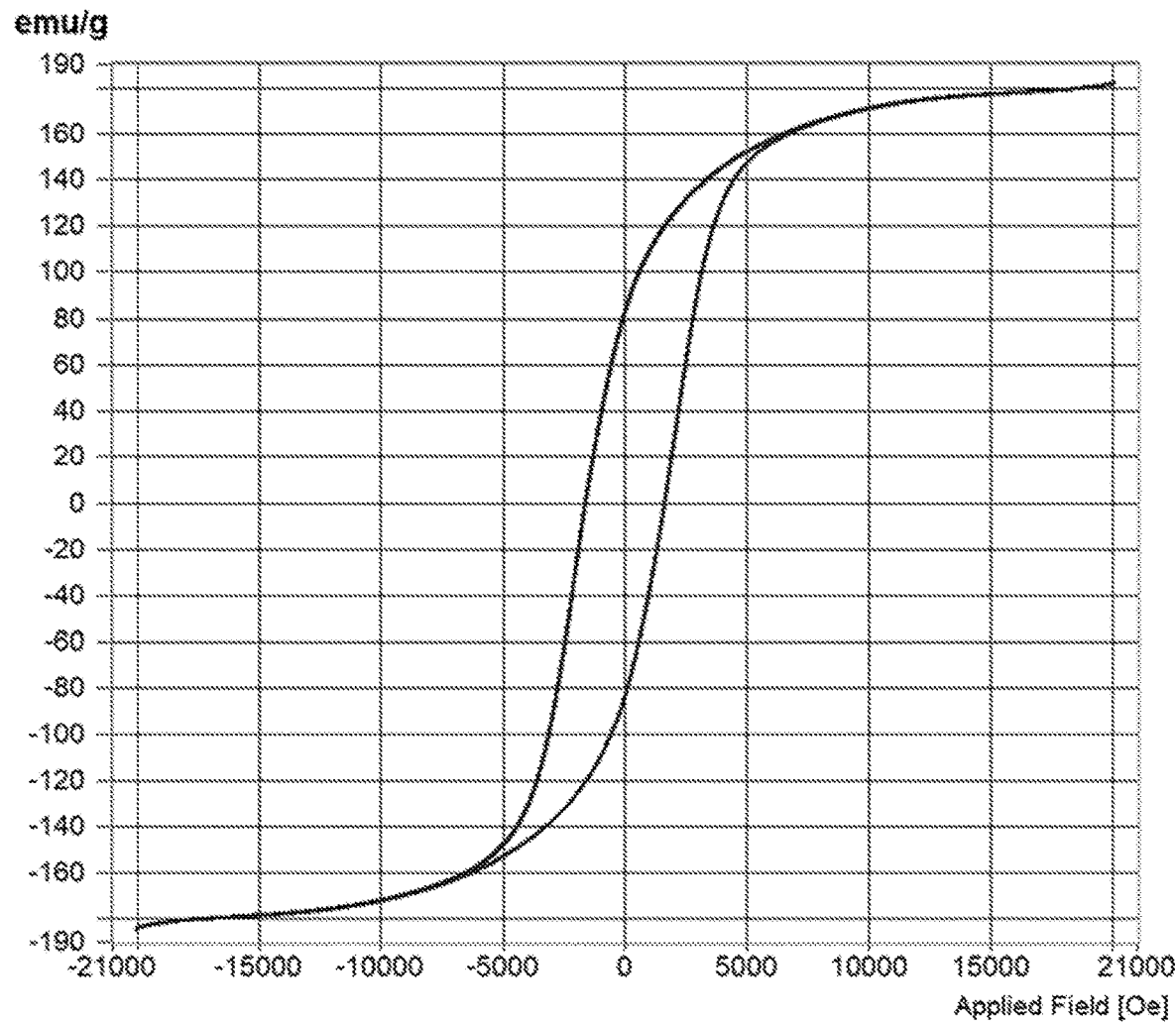
Figure 2.9 Hysteresis loop of isotropic compacted magnet made by uniaxially pressing aluminum oxide coated iron nitride nanoparticles produced in Example 2 to a pressure of 10 MPa.

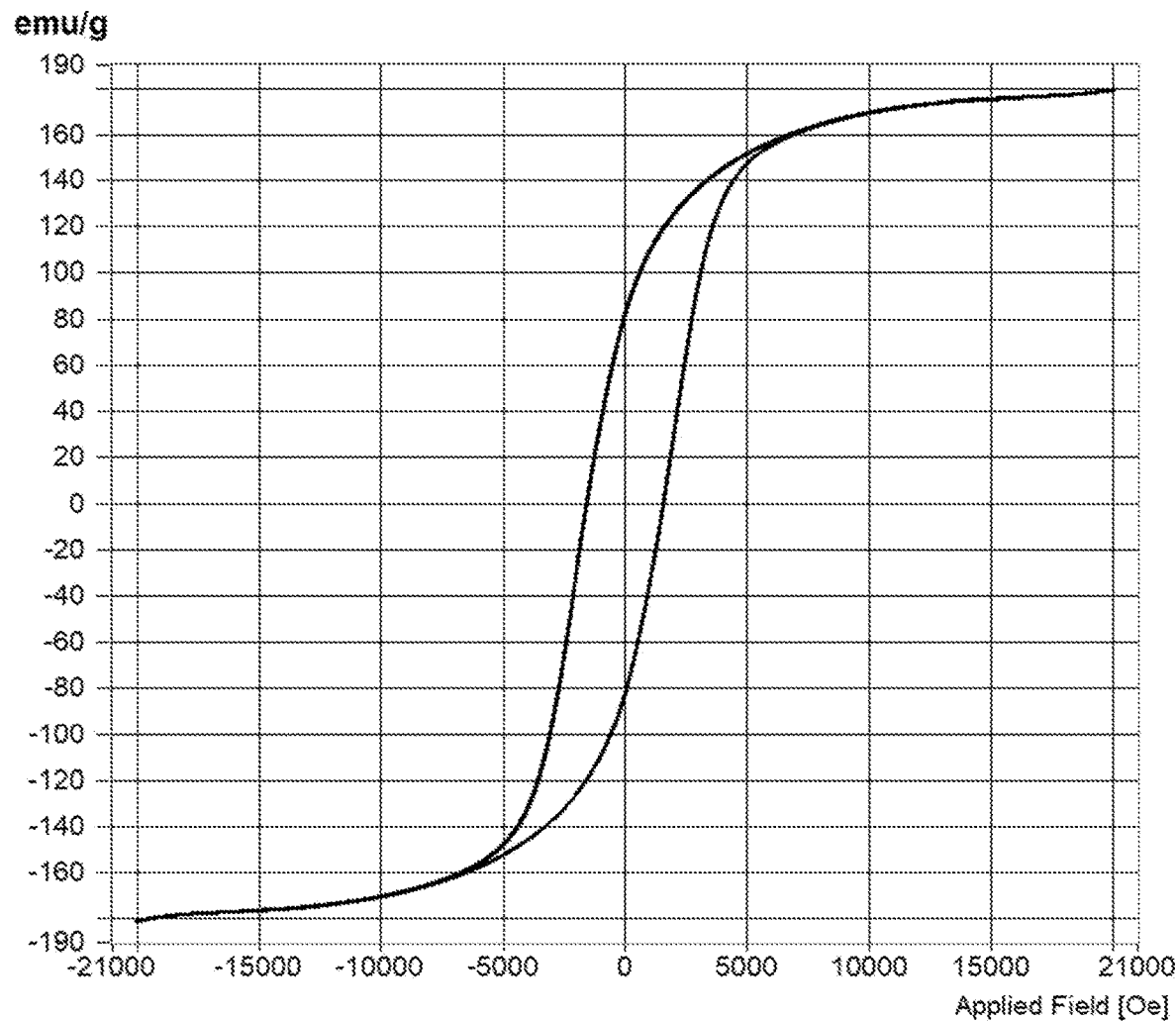
Figure 2.10 Hysteresis loop of isotropic compacted magnet made by uniaxially pressing aluminum oxide coated iron nitride nanoparticles produced in Example 2 to a pressure of 12 MPa.

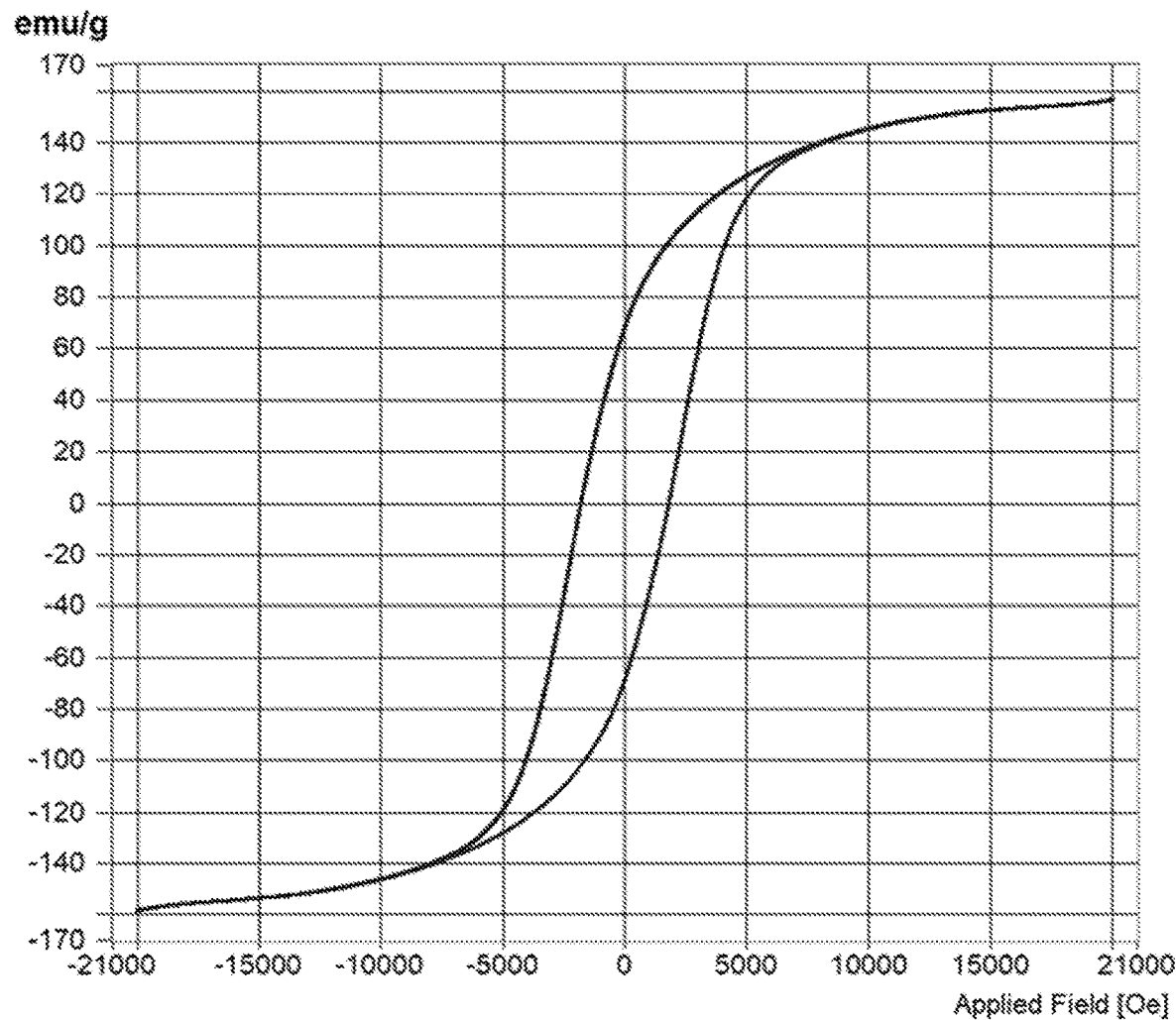
Figure 3.1 Hysteresis loop of aluminum oxide coated iron nitride nanoparticles produced in Example 3.

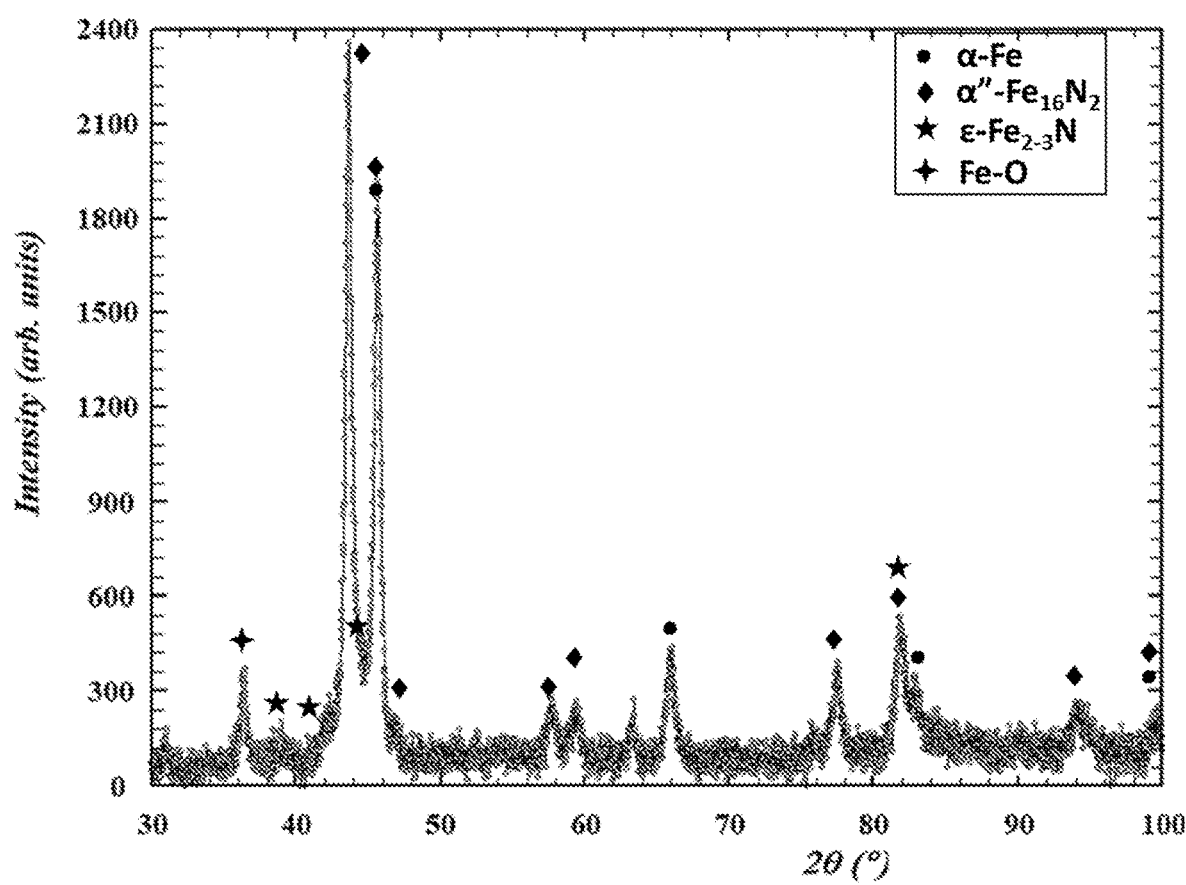
Figure 3.2 X-Ray Diffraction pattern of aluminum oxide coated iron nitride nanoparticles produced in Example 3.

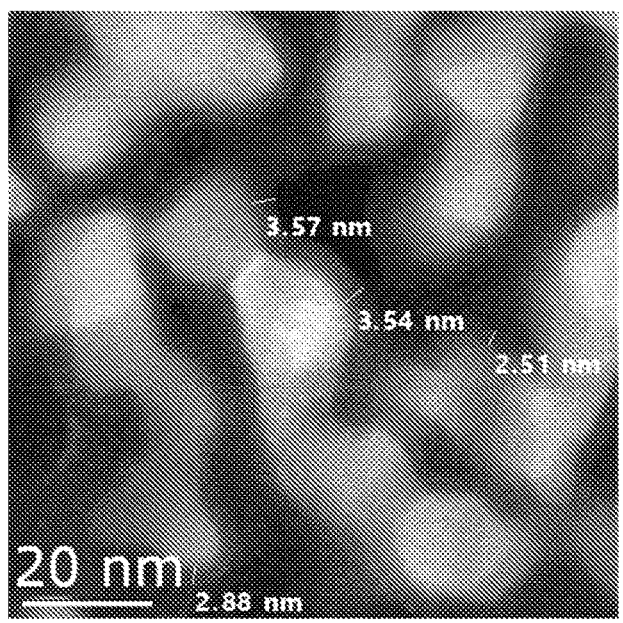
Figure 3.3. Transmission electron microscope image measuring the thickness of an aluminum oxide coating on an iron nitride nanoparticle produced in Example 3.

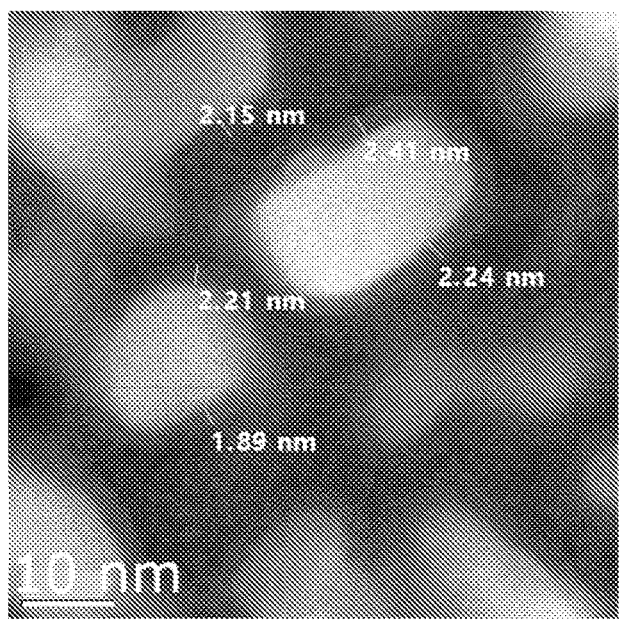
Figure 3.4. Transmission electron microscope image measuring the thickness of an aluminum oxide coating on an iron nitride nanoparticle produced in Example 3.

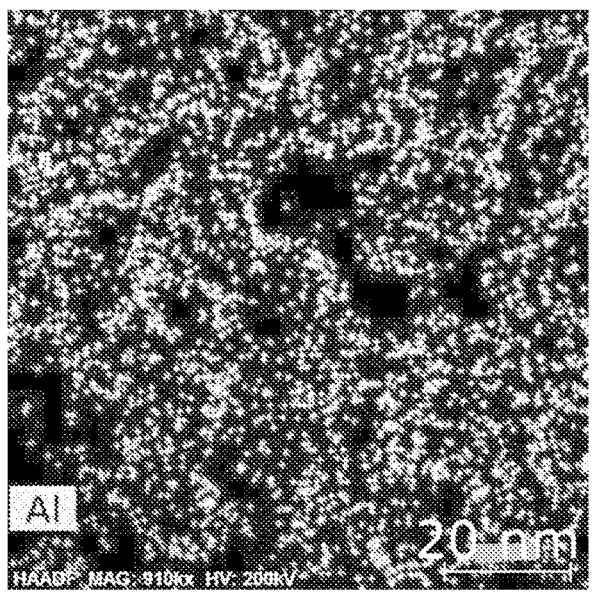
Figure 3.5 Elemental map of Aluminum localized to the surface of an aluminum oxide coated iron nitride nanoparticle from Example 3

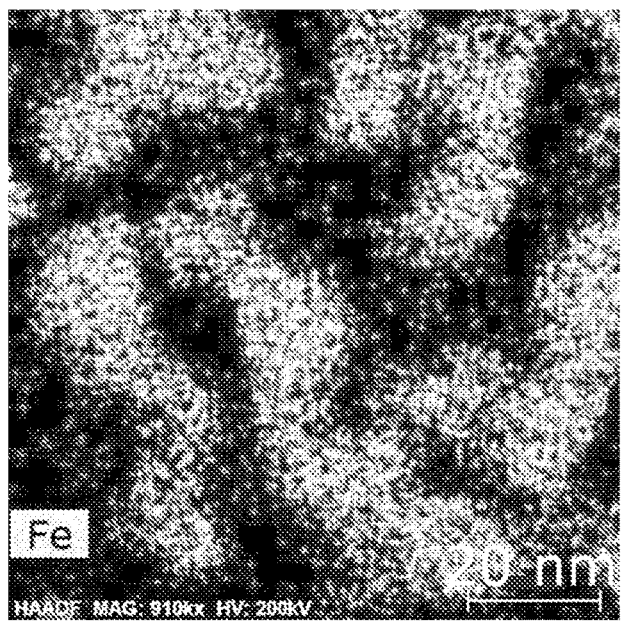
Figure 3.6 Elemental map of Iron distributed through the volume of an aluminum oxide coated iron nitride nanoparticle from Example 3.

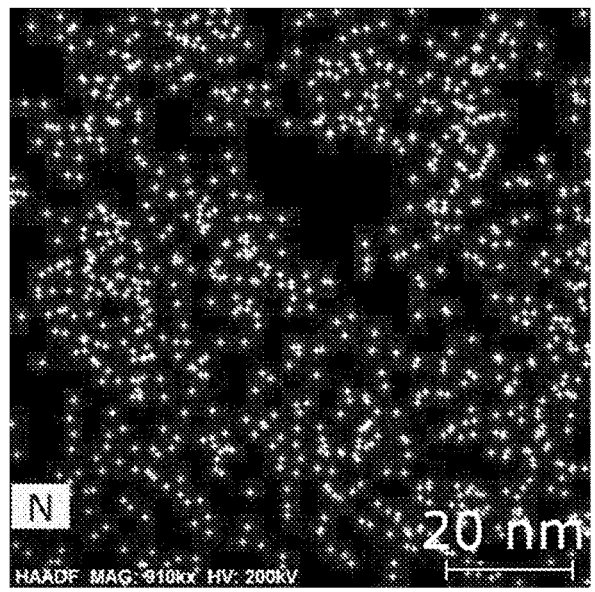
Figure 3.7. Elemental map of Nitrogen distributed through the volume of an aluminum oxide coated iron nitride nanoparticle from Example 3.

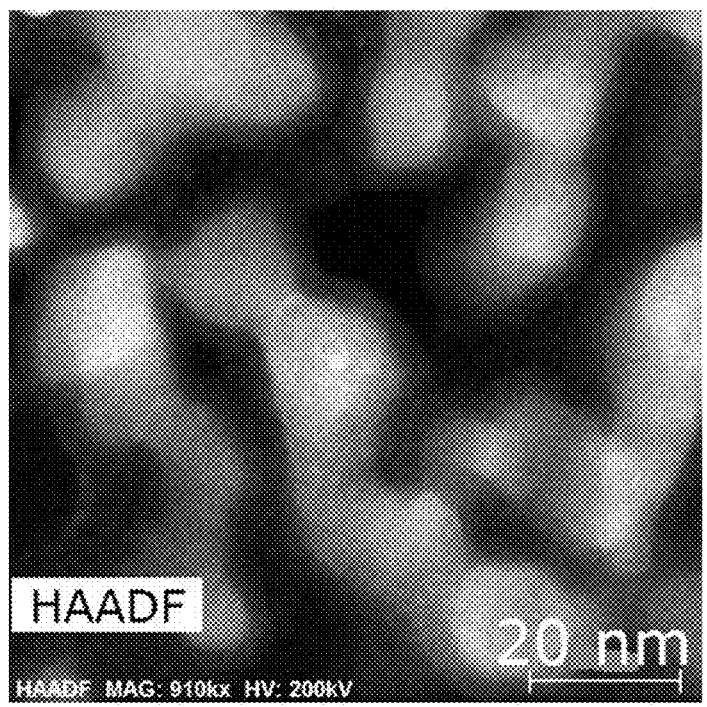
Figure 3.8 Transmission electron microscope image of aluminum oxide coated iron nitride nanoparticle from which Al, Fe, and N elemental maps were collected in Example 3.

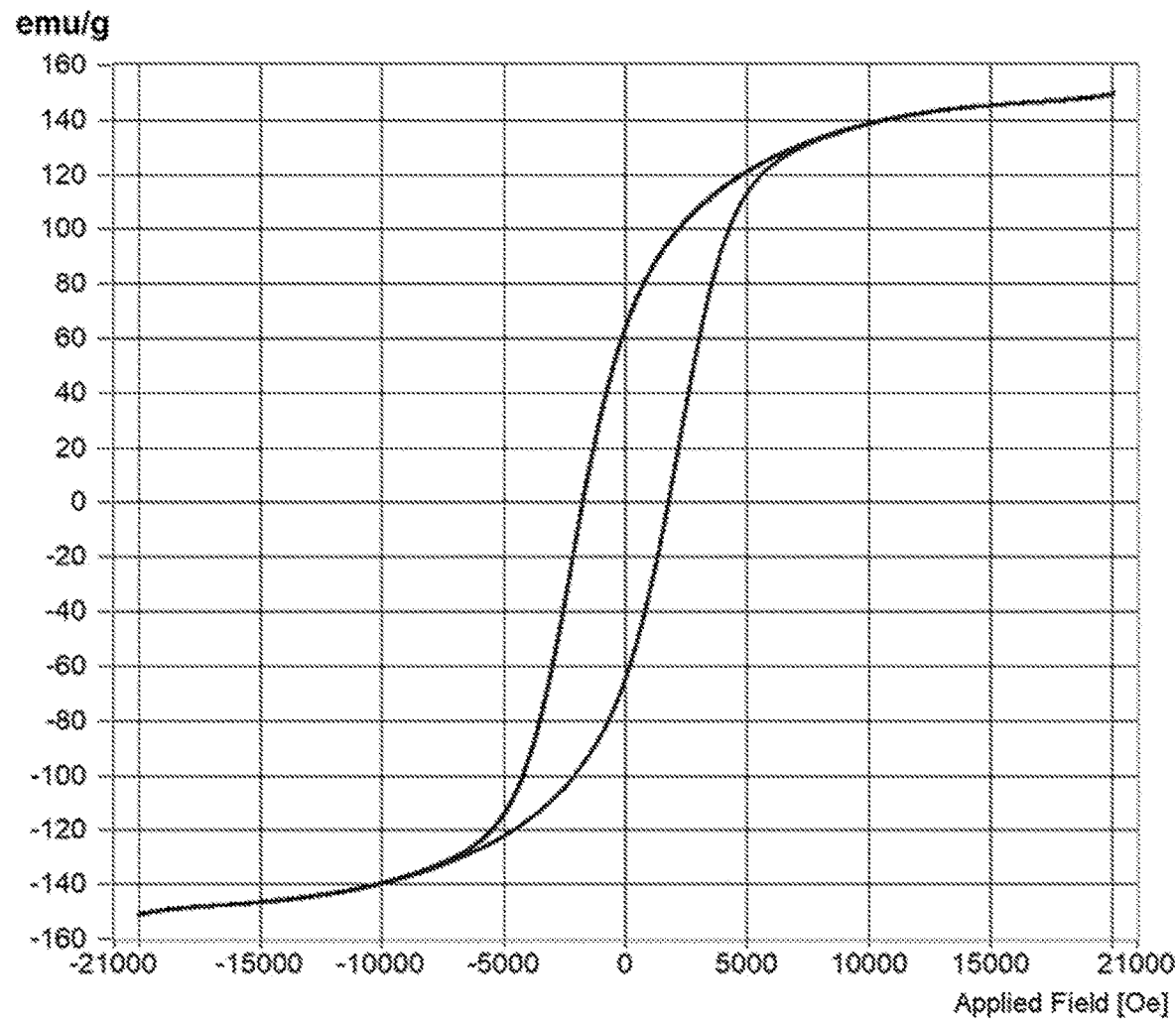
Figure 4.1 Hysteresis loop of aluminum oxide coated iron nitride nanoparticles produced in Example 4.

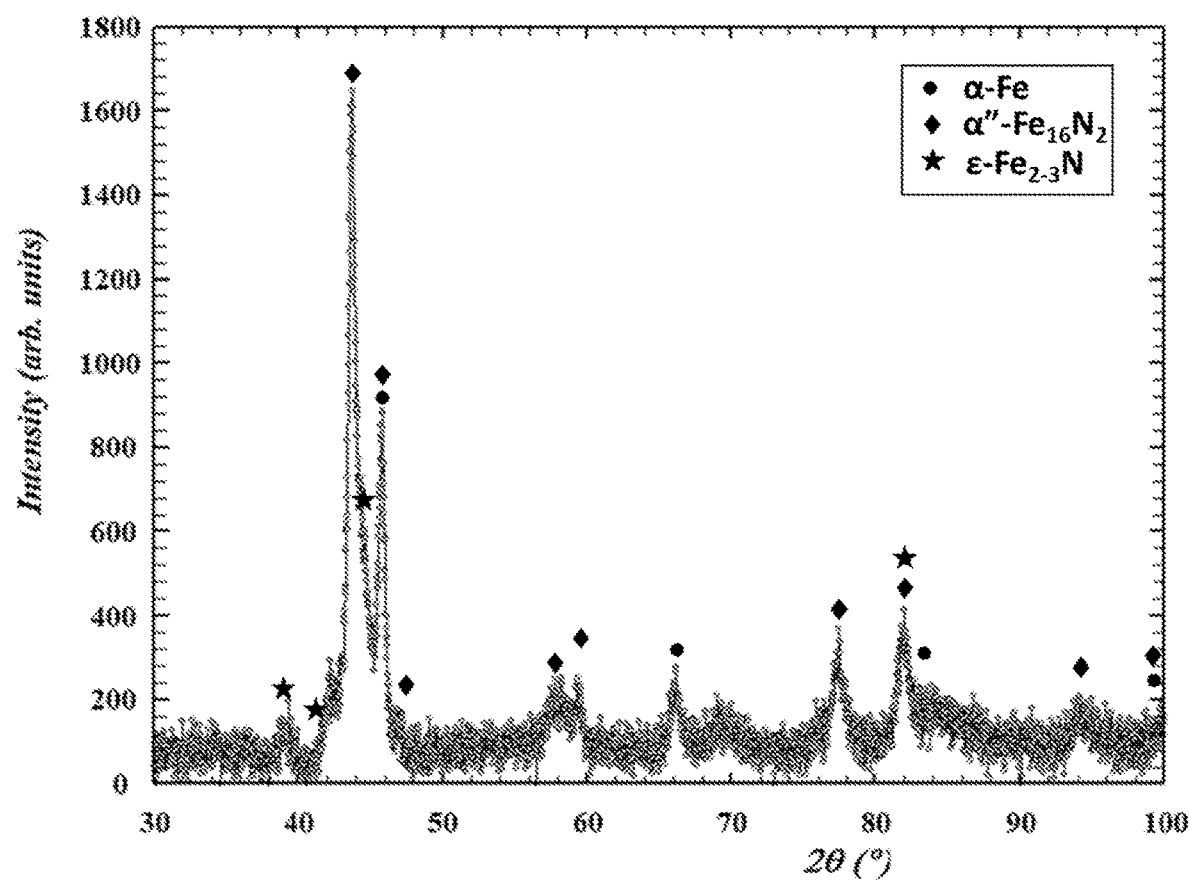
Figure 4.2 Hysteresis loop of aluminum oxide coated iron nitride nanoparticles produced in Example 4.

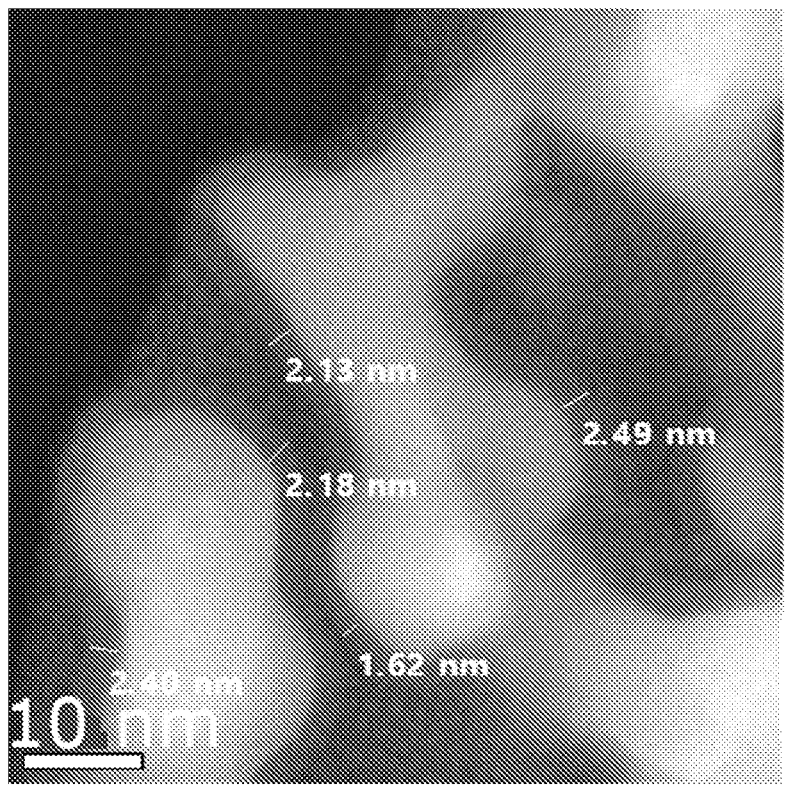
Figure 4.3 Transmission electron microscope image measuring the thickness of an aluminum oxide coating on an iron nitride nanoparticle produced in Example 4.

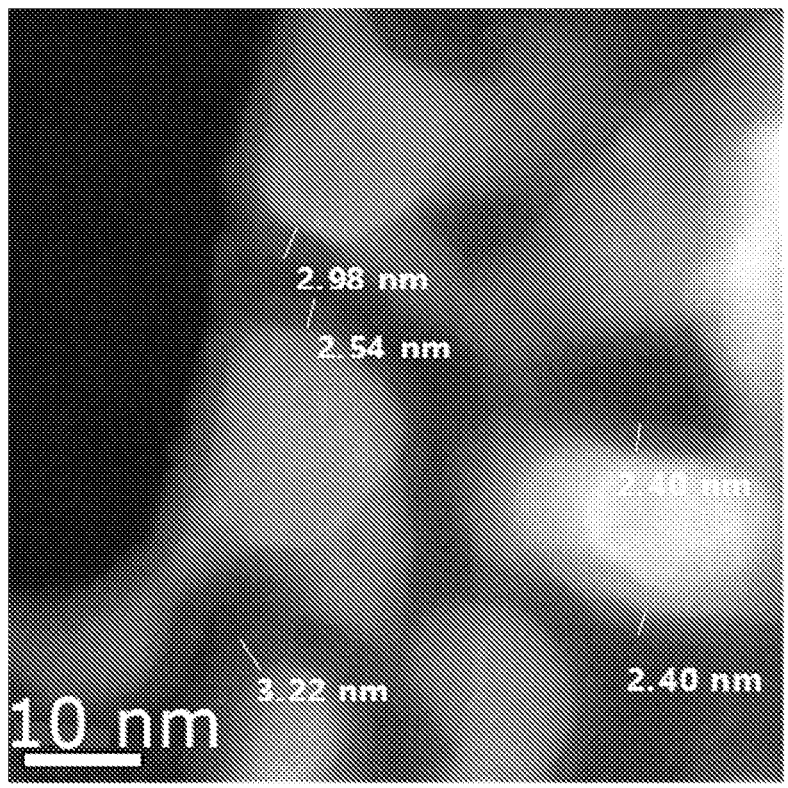
Figure 4.4 Transmission electron microscope image measuring the thickness of an aluminum oxide coating on an iron nitride nanoparticle produced in Example 4.

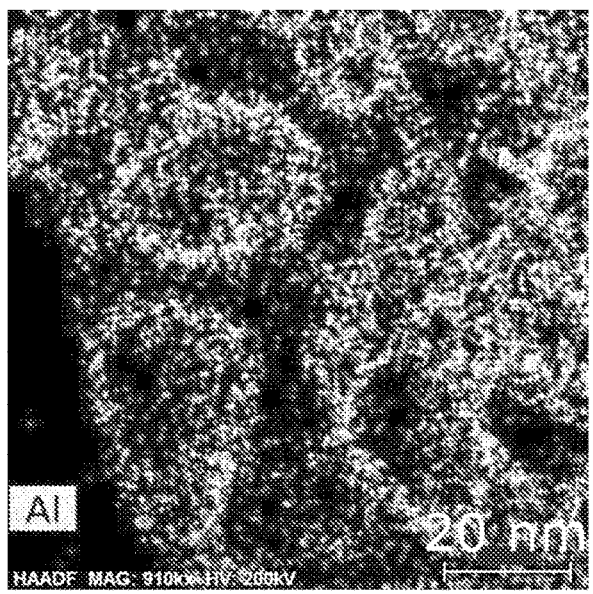
Figure 4.5 Elemental map of Aluminum localized to the surface of an aluminum oxide coated iron nitride nanoparticle from Example 4

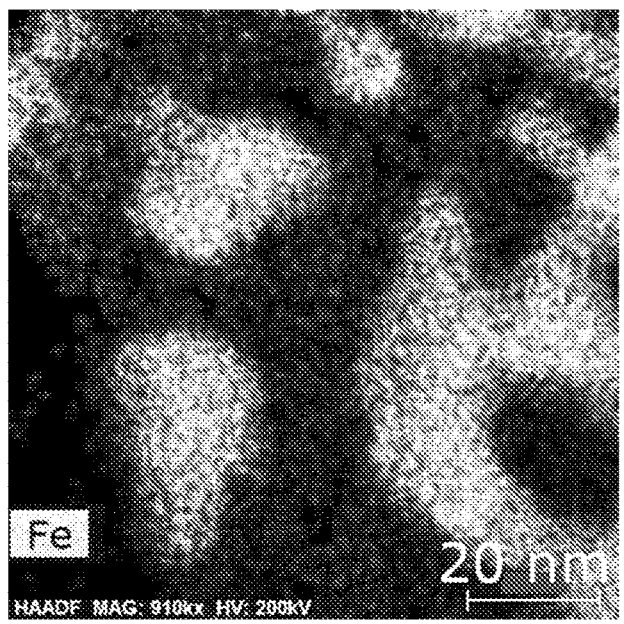
Figure 4.6 Elemental map of Iron distributed through the volume of an aluminum oxide coated iron nitride nanoparticle from Example 4.

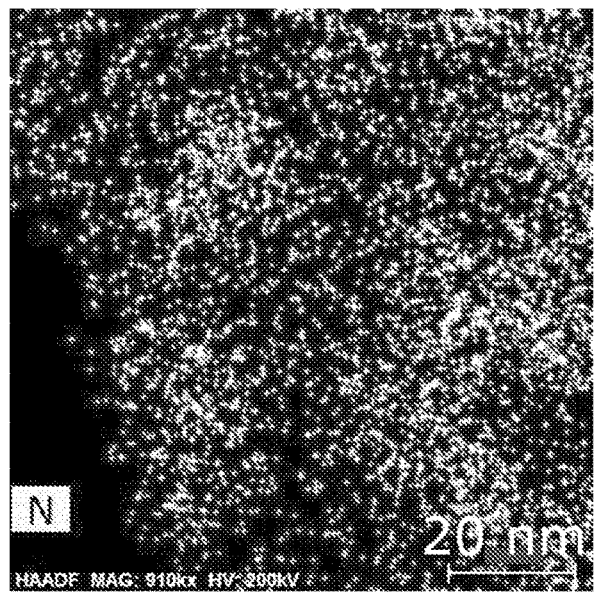
Figure 4.7 Elemental map of Nitrogen distributed through the volume of an aluminum oxide coated iron nitride nanoparticle from Example 4.

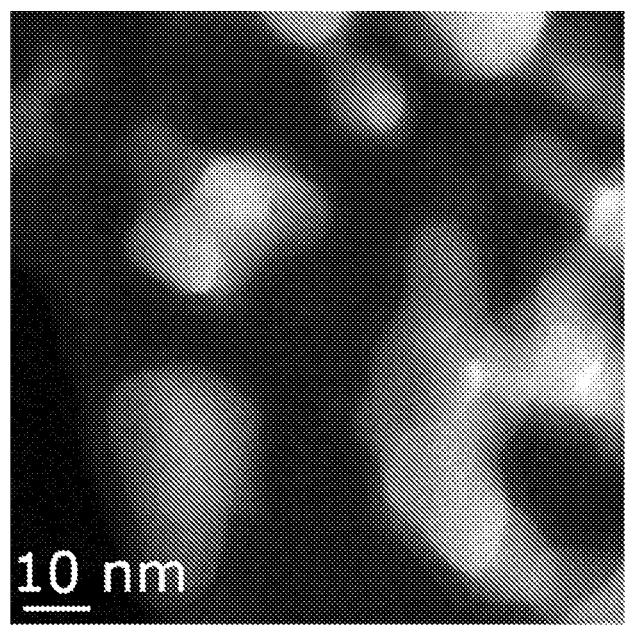
Figure 4.8. Image of aluminum oxide coated iron nitride nanoparticle from which Al, Fe, and N elemental maps were collected in Example 4.

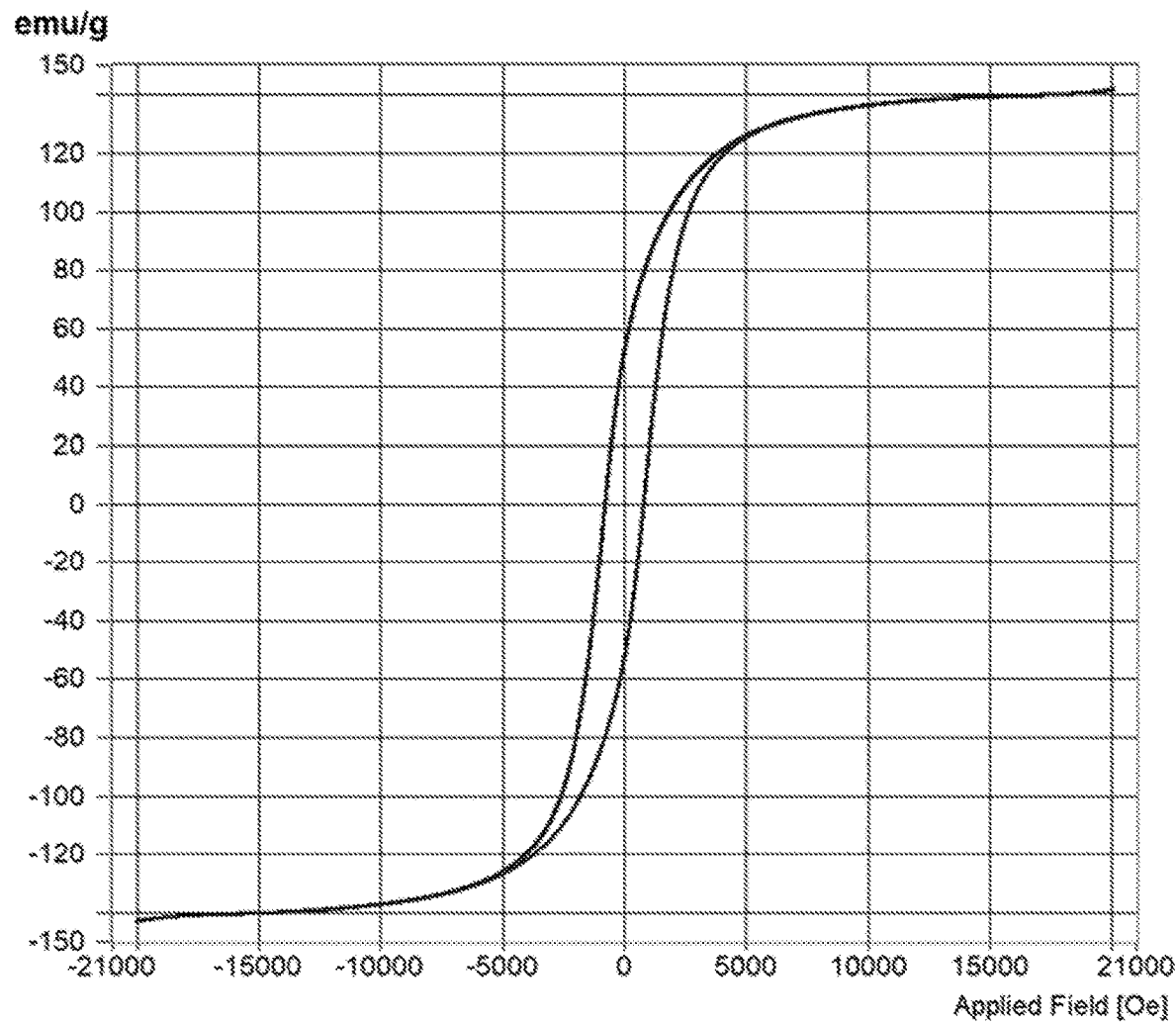
Figure 5.1 Hysteresis loop of aluminum oxide coated iron nitride nanoparticles produced in Example 5.

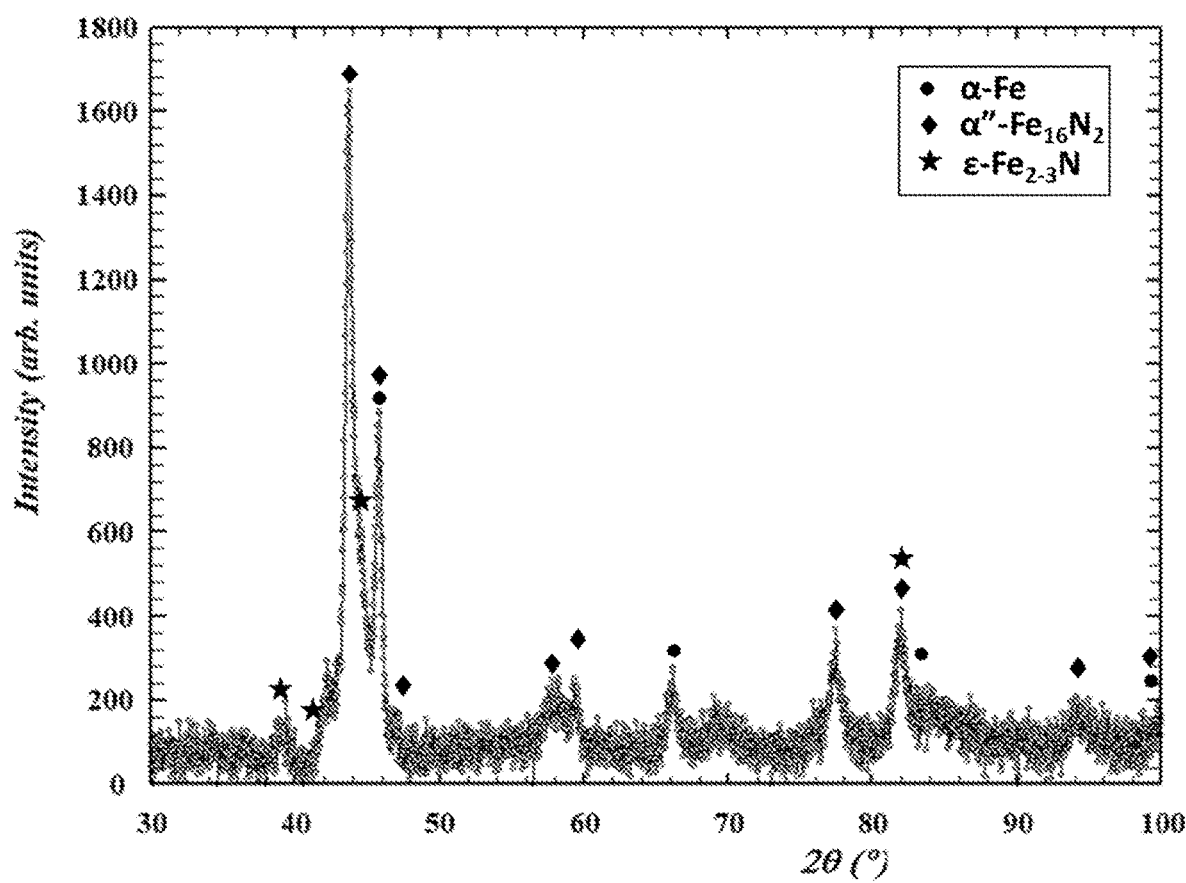
Figure 5.2 X-Ray Diffraction pattern of aluminum oxide coated iron nitride nanoparticles produced in Example 5.

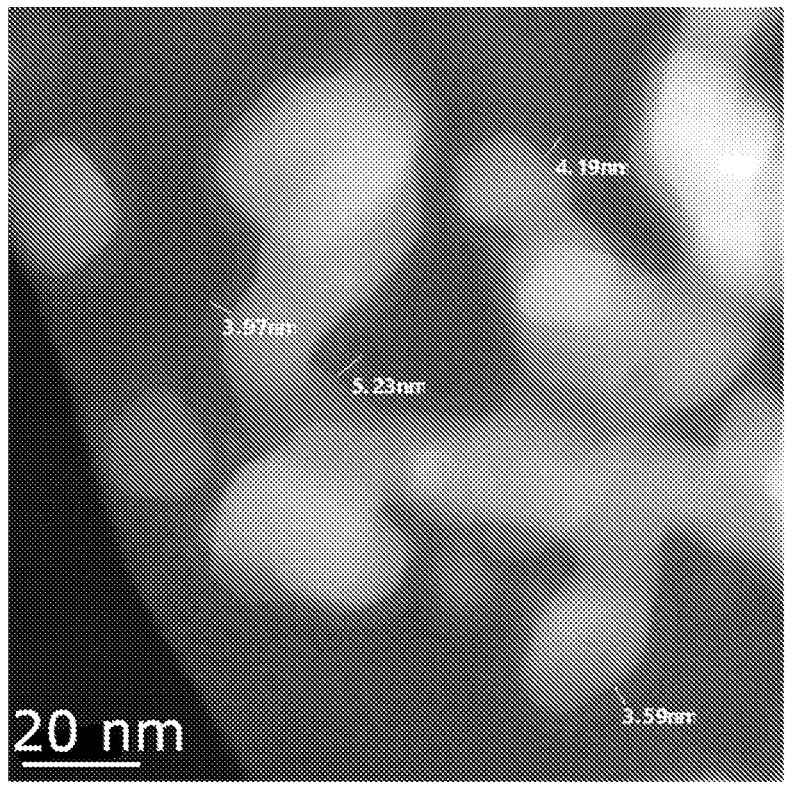
Figure 5.3 Transmission electron microscope image measuring the thickness of an aluminum oxide coating on an iron nitride nanoparticle produced in Example 5.

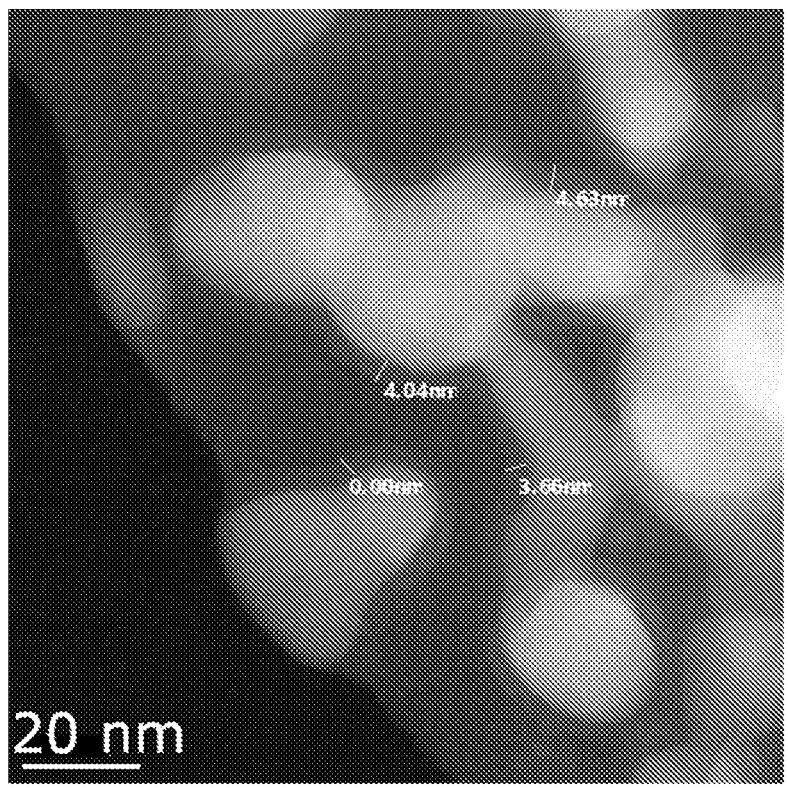
Figure 5.4 Transmission electron microscope image measuring the thickness of an aluminum oxide coating on an iron nitride nanoparticle produced in Example 5.

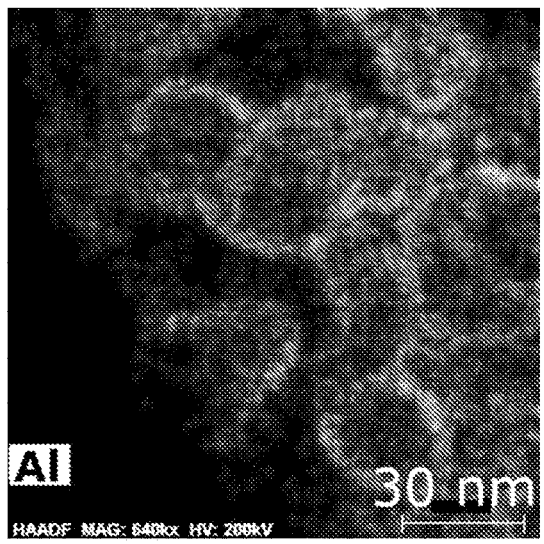
Figure 5.5 Elemental map of Aluminum localized to the surface of an aluminum oxide coated iron nitride nanoparticle from Example 5.

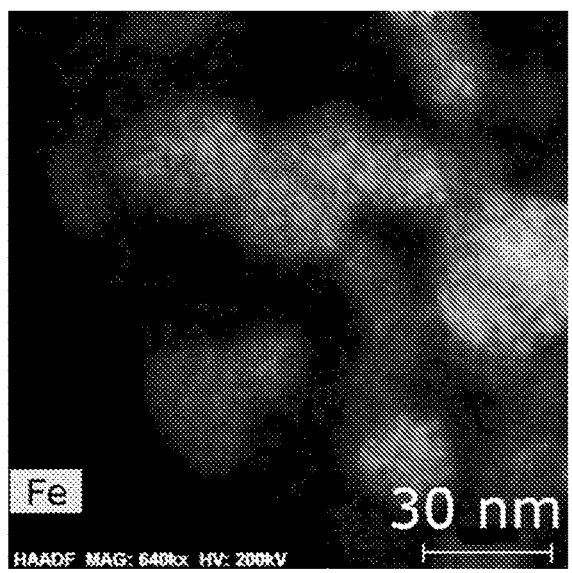
Figure 5.6 Elemental map of Iron distributed through the volume of an aluminum oxide coated iron nitride nanoparticle from Example 5.

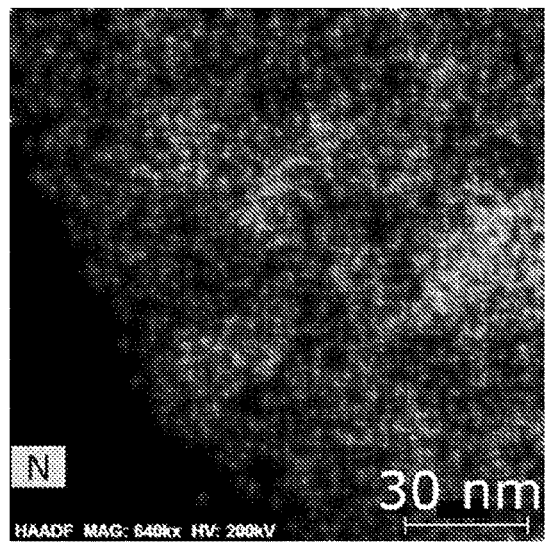
Figure 5.7 Elemental map of Nitrogen distributed through the volume of an aluminum oxide coated iron nitride nanoparticle from Example 5.

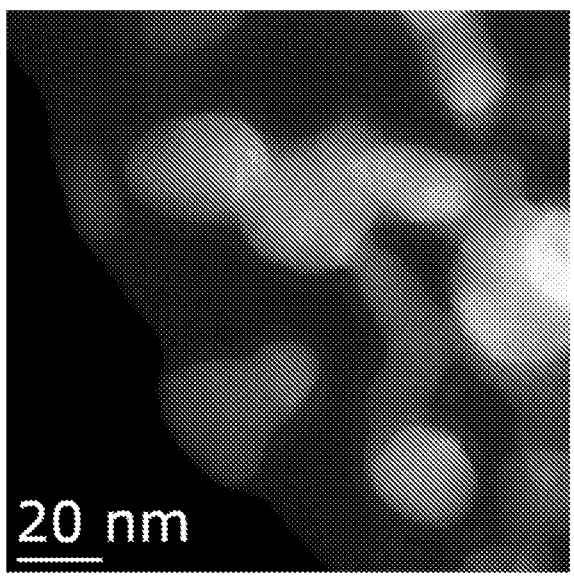
Figure 5.8. Image of aluminum oxide coated iron nitride nanoparticle from which Al, Fe, and N elemental maps were collected in Example 5.

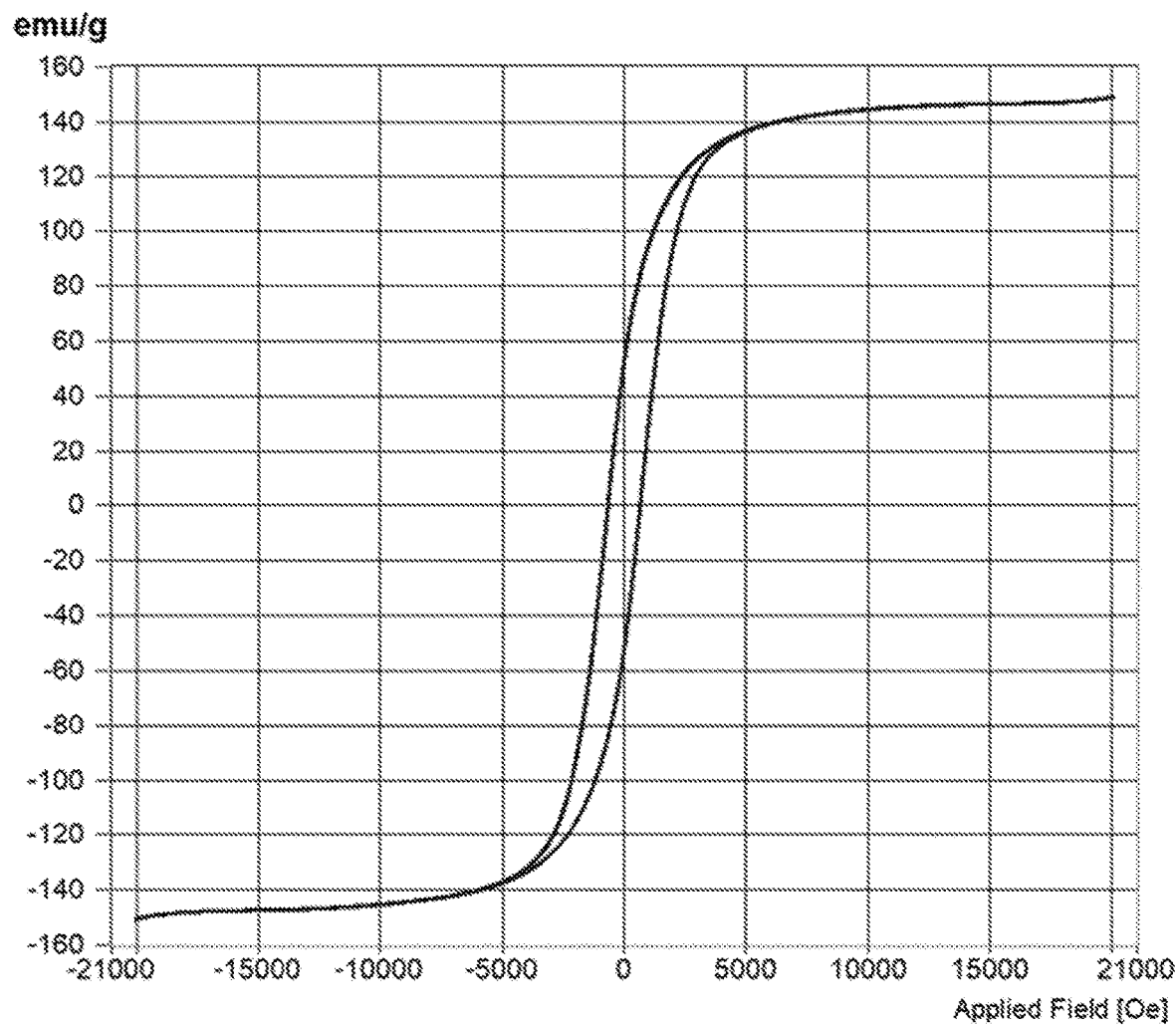
Figure 5.9 Hysteresis loop of isotropic compacted magnet made by uniaxially pressing aluminum oxide coated iron nitride nanoparticles produced in Example 5 to a pressure of 10 MPa.

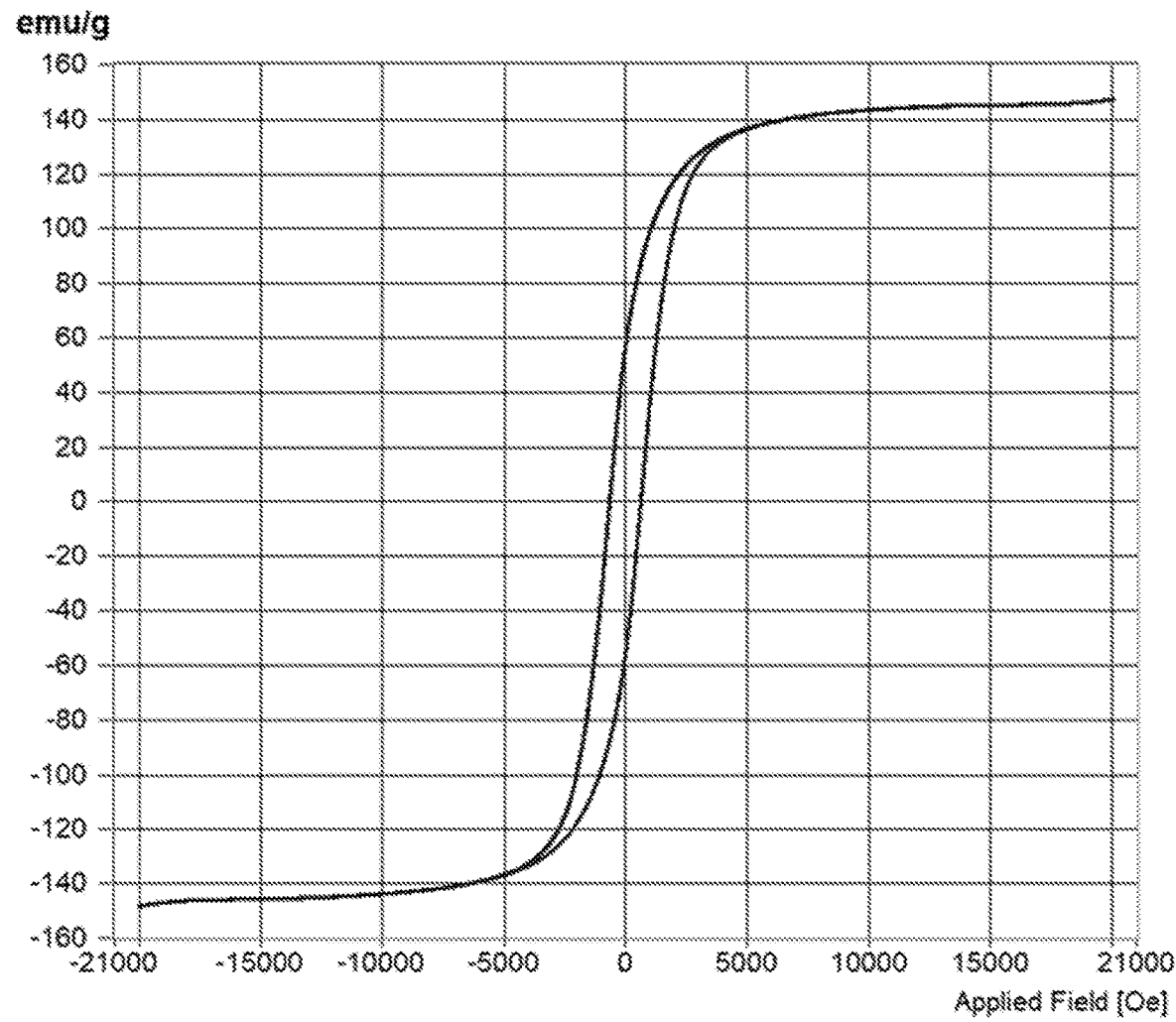
Figure 5.10 Hysteresis loop of isotropic compacted magnet made by uniaxially pressing aluminum oxide coated iron nitride nanoparticles produced in Example 5 to a pressure of 12 MPa.

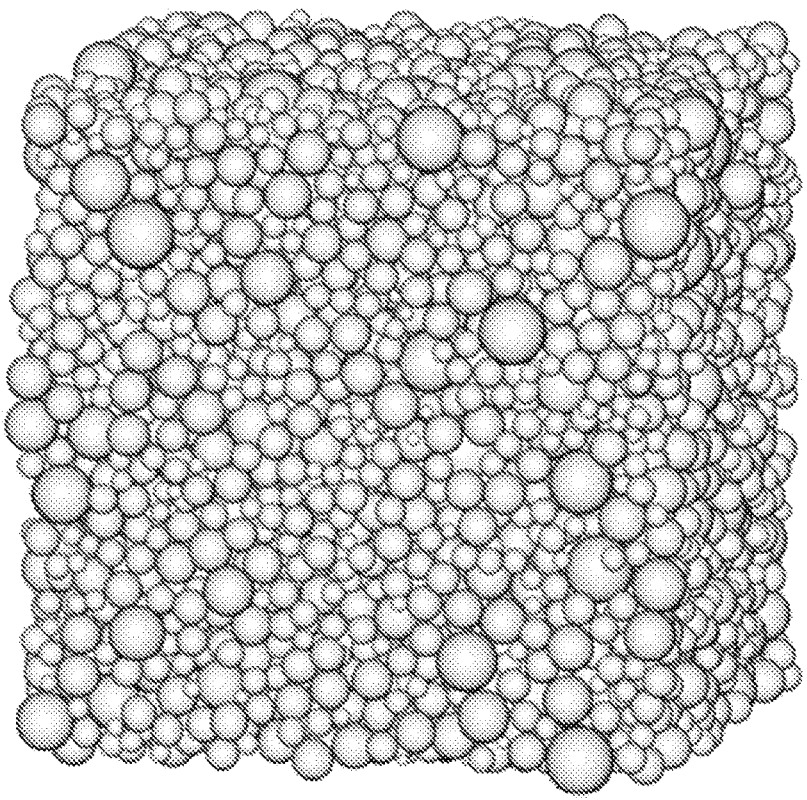
Figure 6. Closest jammed configuration at a density $\varphi = 0.662$ for a random packing of 10,000 polydisperse spheres. The sphere radii distribution is log-normal and has a standard deviation $\sigma = 0.3$. [Credit: Baranau and Tallarek, "Random-close packing limits for monodisperse and polydisperse hard spheres," Soft Matter. Vol. 10, 2014. Pp. 3826-41.].

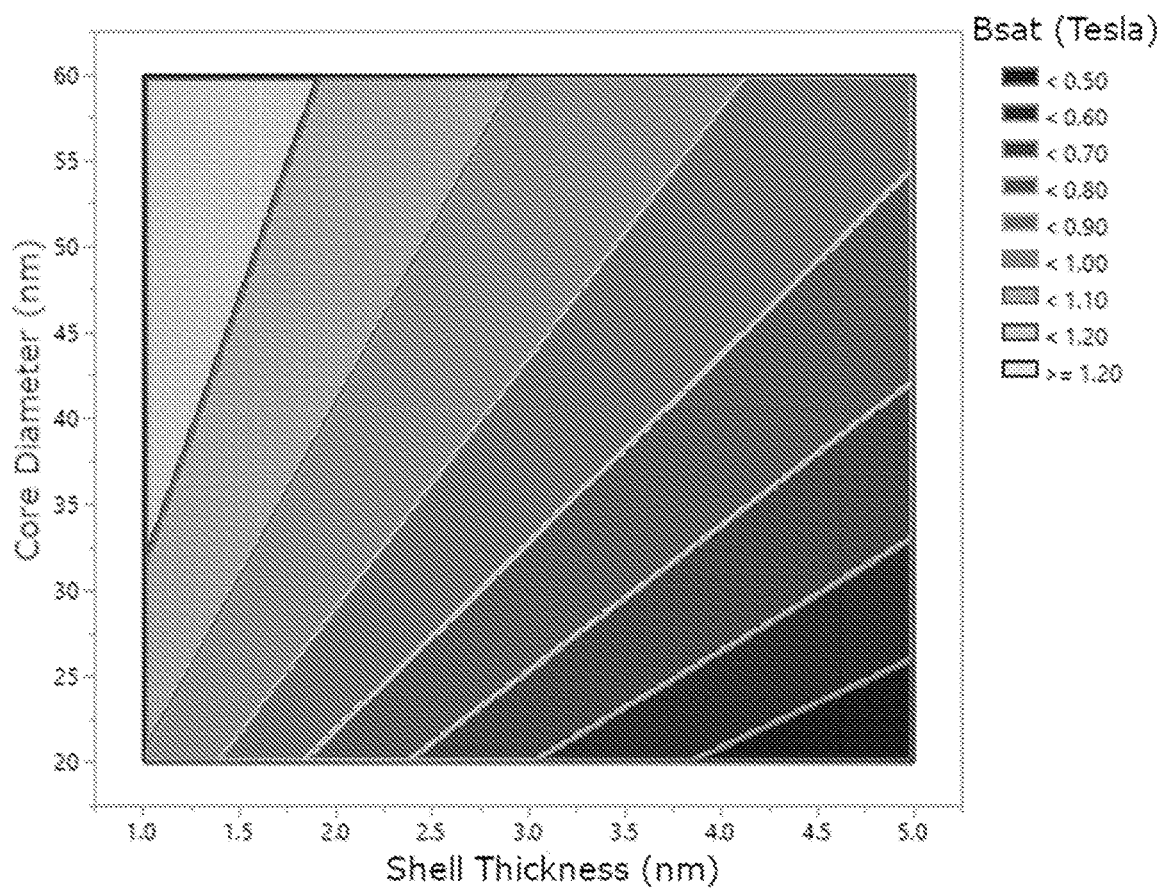

Figure 7.A Contour plots of the saturation magnetization (BSat) of bulk iron nitride magnets comprising bonded iron nitride nanoparticles made according to the present invention showing how BSat varies with nanoparticle core diameter d (nm) and thickness t (nm) for the case where the MSat of the nanoparticle core is 225 emu/gram and the volumetric packing factor is 63%.

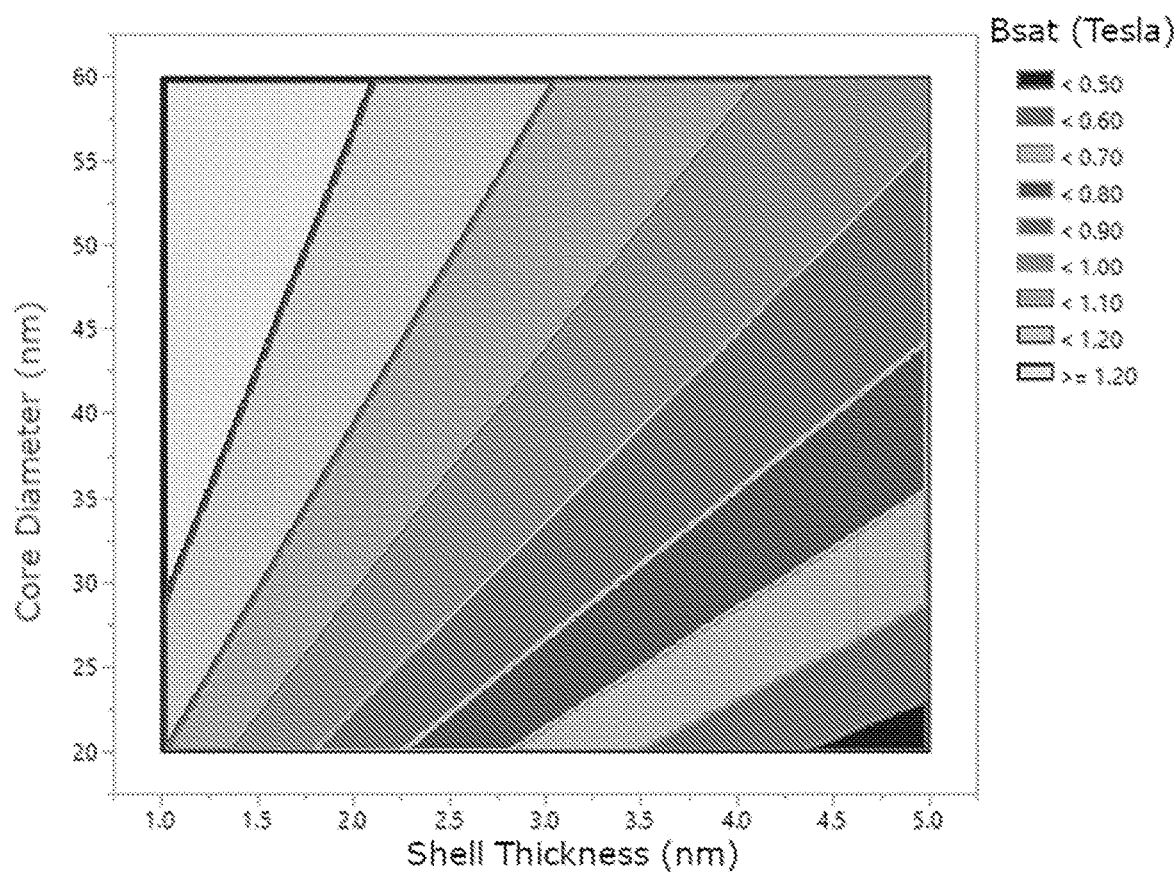

Figure 7.B Contour plots of the saturation magnetization (BSat) of bulk iron nitride magnets comprising bonded iron nitride nanoparticles made according to the present invention showing how BSat varies with nanoparticle core diameter d (nm) and thickness t (nm) for the case where the MSat of the nanoparticle core is 250 emu/gram and the volumetric packing factor is 63%.

- Assume:
  - Core is 100% $\alpha''$-$Fe_{16}N_2$ MSat = 225 emu/g
  - Composite MSat >= 1.1 Tesla
  - Shell is 100% Wustite (FeO), MSat = 0 emu/g

- Case 1
  - Core diameter: 32 nm
  - Shell thickness: 1.0 nm
  - Total diameter: 34 nm
  - Nitrogen content: 2.64 wt%
  - Oxygen content: 2.95 wt%
  - BET Surface area: 24.5 m²/g
  - MSat of core+shell nanoparticles: 195 emu/g

- Case 2
  - Core diameter: 60 nm
  - Shell thickness: 1.9 nm
  - Total diameter: 63.8 nm
  - Nitrogen content: 2.63 wt%
  - Oxygen content: 2.99 wt%
  - BET Surface area: 13.2 m²/g
  - MSat of core+shell nanoparticles: 195 emu/g Figure 8. Characteristics of two exemplary iron nitride core/shell nanoparticles (Case 1 and Case 2) made according to the present invention.

- 25 nm diameter fully nitrided $\alpha''$-$Fe_{16}N_2$ nanoparticles
- 3 nm thick antiferromagnetic or non-magnetic shell
- 31 nm diameter core@shell nanoparticles
- Volume fraction of $\alpha''$-$Fe_{16}N_2$ core = 52.45%
- MSat of 31 nm diameter core@shell nanoparticle: 1.11 Tesla
- Packing density of close random packed spheres: ≈ 63%
- MSat of bonded magnet = 0.70 Tesla

Figure 9. characteristics of an exemplary magnet composed of iron nitride core/shell nanoparticles made according to the present invention.

COERCIVITY-ENHANCED IRON NITRIDE NANOPARTICLES WITH HIGH SATURATION MAGNETIZATION

CROSS-REFERENCE TO RELATED APPLICATIONS

This application is a National Stage of International Patent Application No. PCT/US2020/034331 filed May 22, 2020, and claims priority to U.S. Provisional Patent Application No. 62/851,190, filed May 22, 2019, the disclosures of which are incorporated herein by reference in their entirety.

FIELD OF THE INVENTION

The disclosed invention is in the field of compositions comprising iron nitride and magnetic materials made therefrom.

BACKGROUND OF THE INVENTION

Iron nitride nanoparticles have been produced for many years by controlled nitriding of iron and iron oxide nanoparticle precursors. These materials are of interest because of their potential to be manufactured into high performance, non-rare earth containing permanent magnets. To date, a commercially viable iron nitride permanent magnet has not yet been developed, partly because iron nitride nanoparticles having the $\alpha''\text{-Fe}_{16}N_2$ phase with high coercivity (Hci>1,000 Oe) are observed to have low saturation magnetization (MSat<180 emu/g). Thus, there is a need to manufacture iron nitride nanoparticles having the $\alpha''\text{-Fe}_{16}N_2$ phase for making permanent magnets characterized as having a high coercivity (Hci>1,000 Oe) and high saturation magnetization (MSat>180 emu/g).

SUMMARY OF THE INVENTION

One problem that this invention solves is that iron nitride nanoparticles with high coercivity (Hci>1,000 Oe) are observed to have low saturation magnetization (MSat<180 emu/g). Microscopic examination of the nanoparticles reveals that the iron nitride nanoparticles are characterized as core/shell structures with a non-ferromagnetic iron oxide shell. Without being bound by any theory of operation, we believe that the shell enhances coercivity by magnetically decoupling adjacent nanoparticles. However, the shell thickness has always been observed to be at least 5 nm. This thickness results in a large dilution of the overall saturation magnetization of the core/shell nanoparticle. This dilution of saturation magnetization substantially limits the performance of permanent magnets manufactured from iron nitride nanoparticles.

Another problem the invention solves is that certain, potentially advantageous nanoparticle shell materials, such as thin conformal materials of uniform thickness, usually require temperatures greater than the maximum stability temperature for the $\alpha''\text{-Fe}_{16}N_2$ phase, which is approximately 200° C. or greater. For a structure comprised of a continuous shell around an $\alpha''\text{-Fe}_{16}N_2$ core, these high temperature materials cannot be provided by known deposition processes after the $\alpha''\text{-Fe}_{16}N_2$ phase is formed in the nanoparticle core, or else the $\alpha''\text{-Fe}_{16}N_2$ phase will decompose. Low-temperature deposition methods exist, such as electrodeposition and electroless deposition, but they are very difficult to control and are not readily capable of forming thin materials on nanoparticles. Examples of materials requiring temperatures >200° C. for formation of the shell layer by known deposition methods include nitrides such as AlN, or ductile metals such as Cu, Al, Sn and Zn. In order to enable the combination of these materials and the $\alpha''\text{-Fe}_{16}N_2$ phase, a new structure is provided that provides additional benefits during bulk magnet formation. The compositions provided herein help to maximize the saturation magnetization of a densified bulk magnet comprised of consolidated $\alpha''\text{-Fe}_{16}N_2$ core-shell nanoparticles to prepare commercially acceptable $\alpha''\text{-Fe}_{16}N_2$-based bulk magnets.

The present invention solves this problem by 1) limiting the shell thickness to 5 nm or less, preferably 4 nm or less, preferably 3.5 nm or less, preferably 3 nm or less, preferable 2.5 nm or less, even more preferably 2 nm or less, and even more preferably 1 nm or less, and 2) requiring a minimum core diameter of at least 20 nm, preferably at least 30 nm, preferably at least 40 nm, and even more preferably at least 50 nm, the core diameters are typically less than 100 nm or 200 nm As the core diameter increases and the shell thickness decreases, the overall saturation magnetization of the core/shell magnetization increases. The benefit of the invention is to limit the dilution of saturation magnetization and produce an iron nitride nanoparticle with a saturation magnetization of at least 180 emu/g, preferably at least 195 emu/g.

Accordingly, the present invention provides a plurality of iron-nitride nanoparticles, comprising an iron-based core, the iron-based core comprising 50% or more of $\alpha''\text{-Fe16N2}$ phase in weight; and a thin material adjacently disposed on the iron-based core, wherein the thin material is configured to enable nitridation of the iron-based core. The iron nitride nanoparticles preferably contain single crystal $\alpha''\text{-Fe16N2}$ core with a non-magnetic shell. This is because a nanoparticle with multiple, randomly oriented, crystal grains tend to be more difficult to magnetically align. Suitable thin materials useful for making magnetic materials will typically comprise a non-ferromagnetic material. Non-limiting examples of suitable non-ferromagnetic material thin materials include FeO, $\alpha\text{-Fe2O3}$, ZnO, Al2O3, SiO2, TiO2, ZrO2, CoO, NiO, Mn, Cr, CrN, MnN, Cu, Al, Sn, Zn, or any combination thereof. While the thin material is often provided as a continuous thin shell on the core, the thin material may be a discontinuous shell, for example having bumps, perforations, holes, or both, on the core nanoparticle. Thin materials which cover the core can also be suitably configured to be a substantially continuous shell capable of diffusing nitrogen. Exemplary iron-nitride nanoparticles are characterized as having an Msat greater than about 145 emu/g and a coercivity greater than about 1,000 Oe.

In numerous embodiments, the plurality of nanoparticles are characterized with X-Ray diffraction using an X-Ray source with a Cu target configured to emit monochromatic Cu-Kα X-rays, wherein the X-Ray diffraction gives rise to diffraction peaks wherein the ratio of the integrated intensity of the α-Fe (211) peak (at about 82.2 °2Θ) to the $\alpha''\text{-Fe16N2}$ (202) peak (at about 42.7 °2Θ) is 0.2 or less, preferably 0.15 or less, and even 0.10 or less.

The present invention also provides magnetic materials, comprising: a plurality of iron-nitride nanophases characterized as comprising 50% or more of $\alpha''\text{-Fe}_{16}N_2$ phase based on weight of the magnetic material, and non-ferromagnetic material disposed between the nanophases. Non-ferromagnetic material disposed between the nanophases suitably comprises FeO, $\alpha\text{-Fe2O3}$, ZnO, Al2O3, SiO2, TiO2, ZrO2, CoO, NiO, Mn, Cr, CrN, MnN, Cu, Al, Sn, Zn, or any combination thereof. Exemplary magnetic materials are characterized as having an Msat greater than about 160 emu/g and a coercivity greater than about 700 Oe.

In certain embodiments, the present invention provides core/shell iron nitride nanoparticles with non-ferromagnetic shells, some of which are preferably 1-2 nm thick.

In other embodiments, the present invention provides iron nitride nanoparticles characterized as having coercivity greater than about 2,000 Oe and a magnetic saturation greater than about 195 emu/g.

In certain embodiments, the present invention provides non-ferromagnetic shells 1-2 nm thick on an iron nitride core.

In other embodiments, the present invention uses cryogenic passivation to form non-ferromagnetic shells 1-2 nm thick on an iron nitride core.

In some embodiments, the present invention uses amorphous iron oxide nanoparticles as precursors.

In other embodiments, the present invention provides a nanoparticle structure with a predominantly α-Fe core and a discontinuous shell layer.

In some embodiments, the present invention provides iron nitride nanoparticles characterized as having a structure with a predominantly $\alpha''$-$Fe_{16}N_2$ core and a discontinuous shell layer.

In certain embodiments the shell is provided prior to the nitride phase and the shell is discontinuous and not entirely coating the core region, followed by nitriding an Fe core comprised of for example α-Fe phase resulting in a predominantly $\alpha''$-$Fe_{16}N_2$ core following nitriding, said core surrounded by the discontinuous shell.

In other embodiments, the present invention provides nanoparticles characterized in having a structure with a predominantly $\alpha''$-$Fe_{16}N_2$ core with a continuous shell comprised of a material that enables nitriding of the Fe core. For example, due to an intrinsic property of the shell material or because this shell is thin, such as less than 3 nm thick.

In certain embodiments, the present invention provides for core/shell iron nitride nanoparticles wherein the continuous shell is provided prior to the nitriding phase and the shell enables nitriding of the Fe core despite its presence, followed by nitriding an Fe core comprised of for example α-Fe phase resulting in a predominantly $\alpha''$-$Fe_{16}N_2$ core following nitriding, said core surrounded by the discontinuous shell.

In other embodiments, the present invention provides nanoparticles characterized as having a structure with a predominantly $\alpha''$-$Fe_{16}N_2$ core with a first discontinuous shell, and a second thin, continuous or discontinuous shell layer of thickness less than 3 nm.

In some embodiments, core/shell iron nitride nanoparticles are provided, wherein the first shell is provided prior to the nitride phase and the shell is discontinuous and not entirely coating the core region. This is followed by nitriding an Fe core comprised of for example α-Fe phase resulting in a predominantly $\alpha''$-$Fe_{16}N_2$ core following nitriding, said core surrounded by the discontinuous shell. A second shell is then provided, which is continuous or discontinuously coating the predominantly $\alpha''$-$Fe_{16}N_2$ core and first shell material.

The general description and the following detailed description are exemplary and explanatory only and are not restrictive of the invention, as defined in the appended claims. Other aspects of the present invention will be apparent to those skilled in the art in view of the detailed description of the invention as provided herein.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings:

FIG. 1.1 provides a hysteresis loop of aluminum oxide coated iron nitride nanoparticles produced in Example 1.

FIG. 1.2 provides an X-Ray Diffraction pattern of aluminum oxide coated iron nitride nanoparticles produced in Example 1.

FIG. 1.3 provides a transmission electron microscope image measuring the thickness of an aluminum oxide coating on an iron nitride nanoparticle produced in Example 1.

FIG. 1.4 provides a transmission electron microscope image measuring the thickness of an aluminum oxide coating on an iron nitride nanoparticle produced in Example 1.

FIG. 1.5 depicts an elemental map of Aluminum localized to the surface of an aluminum oxide coated iron nitride nanoparticle from Example 1.

FIG. 1.6 depicts an elemental map of Iron distributed through the volume of an aluminum oxide coated iron nitride nanoparticle from Example 1.

FIG. 1.7 depicts an elemental map of Nitrogen distributed through the volume of an aluminum oxide coated iron nitride nanoparticle from Example 1.

FIG. 1.8 provides an image of aluminum oxide coated iron nitride nanoparticle from which Al, Fe, and N elemental maps were collected in Example 1.

FIG. 1.9 provides a hysteresis loop of isotropic compacted magnet made by uniaxially pressing aluminum oxide coated iron nitride nanoparticles produced in Example 1 to a pressure of 10 MPa.

FIG. 1.10 provides a hysteresis loop of isotropic compacted magnet made by uniaxially pressing aluminum oxide coated iron nitride nanoparticles produced in Example 1 to a pressure of 12 MPa.

FIG. 2.1 provides a hysteresis loop of aluminum oxide coated iron nitride nanoparticles produced in Example 2.

FIG. 2.2 provides an X-Ray Diffraction pattern of aluminum oxide coated iron nitride nanoparticles produced in Example 2.

FIG. 2.3 provides a transmission electron microscope image measuring the thickness of an aluminum oxide coating on an iron nitride nanoparticle produced in Example 2.

FIG. 2.4 provides a transmission electron microscope image measuring the thickness of an aluminum oxide coating on an iron nitride nanoparticle produced in Example 2.

FIG. 2.5 provides an elemental map of Aluminum localized to the surface of an aluminum oxide coated iron nitride nanoparticle from Example 2.

FIG. 2.6 provides an elemental map of Iron distributed through the volume of an aluminum oxide coated iron nitride nanoparticle from Example 2.

FIG. 2.7 provides an elemental map of Nitrogen distributed through the volume of an aluminum oxide coated iron nitride nanoparticle from Example 2.

FIG. 2.8 provides a TEM image of aluminum oxide coated iron nitride nanoparticle from which Al, Fe, and N elemental maps were collected in Example 2.

FIG. 2.9 provides a hysteresis loop of isotropic compacted magnet made by uniaxially pressing aluminum oxide coated iron nitride nanoparticles produced in Example 2 to a pressure of 10 MPa.

FIG. 2.10 provides a hysteresis loop of isotropic compacted magnet made by uniaxially pressing aluminum oxide coated iron nitride nanoparticles produced in Example 2 to a pressure of 12 MPa.

FIG. 3.1 Hysteresis loop of aluminum oxide coated iron nitride nanoparticles produced in Example 3.

FIG. 3.2 provides an X-Ray Diffraction pattern of aluminum oxide coated iron nitride nanoparticles produced in Example 3.

FIG. 3.3 provides a transmission electron microscope image measuring the thickness of an aluminum oxide coating on an iron nitride nanoparticle produced in Example 3.

FIG. 3.4 provides a transmission electron microscope image measuring the thickness of an aluminum oxide coating on an iron nitride nanoparticle produced in Example 3.

FIG. 3.5 provides an elemental map of Aluminum localized to the surface of an aluminum oxide coated iron nitride nanoparticle from Example 3.

FIG. 3.6 provides an elemental map of Iron distributed through the volume of an aluminum oxide coated iron nitride nanoparticle from Example 3

FIG. 3.7 provides an elemental map of Nitrogen distributed through the volume of an aluminum oxide coated iron nitride nanoparticle from Example 3.

FIG. 3.8 provides a transmission electron microscope image of aluminum oxide coated iron nitride nanoparticle from which Al, Fe, and N elemental maps were collected in Example 3.

FIG. 4.1 provides a hysteresis loop of aluminum oxide coated iron nitride nanoparticles produced in Example 4.

FIG. 4.2 provides a hysteresis loop of aluminum oxide coated iron nitride nanoparticles produced in Example 4.

FIG. 4.3 provides a transmission electron microscope image measuring the thickness of an aluminum oxide coating on an iron nitride nanoparticle produced in Example 4.

FIG. 4.4 provides a transmission electron microscope image measuring the thickness of an aluminum oxide coating on an iron nitride nanoparticle produced in Example 4.

FIG. 4.5 provides an elemental map of Aluminum localized to the surface of an aluminum oxide coated iron nitride nanoparticle from Example 4.

FIG. 4.6 provides an elemental map of Iron distributed through the volume of an aluminum oxide coated iron nitride nanoparticle from Example 4.

FIG. 4.7 provides an elemental map of Nitrogen distributed through the volume of an aluminum oxide coated iron nitride nanoparticle from Example 4.

FIG. 4.8 provides a transmission electron microscope image of aluminum oxide coated iron nitride nanoparticle from which Al, Fe, and N elemental maps were collected in Example 4.

FIG. 5.1 provides a hysteresis loop of aluminum oxide coated iron nitride nanoparticles produced in Example 5.

FIG. 5.2 provides an X-Ray Diffraction pattern of aluminum oxide coated iron nitride nanoparticles produced in Example 5.

FIG. 5.3 provides a transmission electron microscope image measuring the thickness of an aluminum oxide coating on an iron nitride nanoparticle produced in Example 5.

FIG. 5.4 provides a transmission electron microscope image measuring the thickness of an aluminum oxide coating on an iron nitride nanoparticle produced in Example 5.

FIG. 5.5 provides an elemental map of Aluminum localized to the surface of an aluminum oxide coated iron nitride nanoparticle from Example 5.

FIG. 5.6 provides an elemental map of Iron distributed through the volume of an aluminum oxide coated iron nitride nanoparticle from Example 5.

FIG. 5.7 provides an elemental map of Nitrogen distributed through the volume of an aluminum oxide coated iron nitride nanoparticle from Example 5.

FIG. 5.8 provides a TEM image of aluminum oxide coated iron nitride nanoparticle from which Al, Fe, and N elemental maps were collected in Example 5.

FIG. 5.9 provides a hysteresis loop of isotropic compacted magnet made by uniaxially pressing aluminum oxide coated iron nitride nanoparticles produced in Example 5 to a pressure of 10 MPa.

FIG. 5.10 provides a hysteresis loop of isotropic compacted magnet made by uniaxially pressing aluminum oxide coated iron nitride nanoparticles produced in Example 5 to a pressure of 12 MPa.

FIG. 6 illustrates the closest jammed configuration at a density $\varphi=0.662$ for a random packing of 10,000 polydisperse spheres. The sphere radii distribution is log-normal and has a standard deviation $\sigma=0.3$. [Credit: Baranau and Tallarek, "Random-close packing limits for monodisperse and polydisperse hard spheres," *Soft Matter*. Vol. 10, 2014. Pp. 3826-41.];

FIG. 7.A illustrates contour plots of the saturation magnetization (Bsat) of bulk iron nitride magnets comprising bonded iron nitride nanoparticles made according to the present invention showing how Bsat varies with nanoparticle core diameter d (nm) and thickness t (nm) the case where the BSat of the nanoparticle core is 225 emu/gram and the volumetric packing factor is 63%.

FIG. 7.B illustrates contour plots of the saturation magnetization (Bsat) of bulk iron nitride magnets comprising bonded iron nitride nanoparticles made according to the present invention showing how Bsat varies with nanoparticle core diameter d (nm) and thickness t (nm) for the case where the BSat of the nanoparticle core is 250 emu/gram and the volumetric packing factor is 63%.

FIG. 8 tabulates the characteristics of two exemplary iron nitride core/shell nanoparticles (Case 1 and Case 2) made according to the present invention; and FIG. 9 tabulates the characteristics of an exemplary magnet composed of iron nitride core/shell nanoparticles made according to the present invention.

DETAILED DESCRIPTION OF ILLUSTRATIVE EMBODIMENTS

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

The invention enables the formation of a core/shell iron nitride nanoparticle. The core may be comprised of a mass fraction of at least 50%, preferably at least 80%, of the $\alpha''$-$Fe_{16}N_2$ phase. The remaining mass fraction of the core may be comprised of a mixture of $\alpha$-Fe, $\alpha'$-$Fe_8N$, $\gamma'$-$Fe_4N$, and $\varepsilon$-$Fe_{2-3}N$ phases.

The thin material for the shell may be comprised of one or more non-ferromagnetic materials or phases within the shell. Non-limiting examples of non-ferromagnetic materials include FeO, $\alpha$-$Fe_2O_3$, ZnO, $Al_2O_3$, $SiO_2$, $TiO_2$, $ZrO_2$, CoO, NiO, Mn, Cr, CrN, AlN, MnN, Cu, Al, Sn and Zn.

The diameter of the core may be from 20 to 200 nm, preferably 20 to 100 nm, and even more preferably 40-80 nm. The thickness of the shell may be from 0.1 to 4.0 nm, and preferably from 0.1 to 1.0 nm. The shell material may also be less than 4 nm, or less than 3.5 nm, or less than 3 nm, or less than 2.5 nm, or less than 2 nm, or less than 1.5 nm.

The shape of the core/shell nanoparticle may be spherical or non-spherical. Examples of non-spherical shapes include rods, needles, prolate ellipsoids, oblate ellipsoids, disks, and plates. Further examples of non-spherical shapes include porous structures such as foams, gels, and sponges.

The cores may be produced by methods including nitriding of nanoparticle precursors. The nanoparticle precursors may include $\alpha$-Fe, $Fe_3O_4$, $\alpha$-$Fe_2O_3$, and $\gamma$-$Fe_2O_3$. The nanoparticle precursors may also include non-crystalline nanoparticles comprised of iron, iron oxide, iron nitride, iron boride, and mixtures thereof. If iron oxide nanoparticle precursors are used, the nanoparticles may be subjected to a reduction treatment prior to nitriding. If an $\alpha$-Fe nanoparticle precursor is used, the nanoparticle may be directly nitrided. If the $\alpha$-Fe nanoparticle precursor has a preexisting oxide shell, then the $\alpha$-Fe nanoparticle precursor may be subjected to a reduction treatment prior to nitriding. $\alpha$-Fe nanoparticle precursors may also be subjected to an oxidation treatment prior to a reduction and nitriding treatment.

Non-ferromagnetic shells may be formed on the cores using any of a variety of suitable chemical deposition techniques. Another way to form the shells is to expose the iron nitride cores to an atmosphere with a controlled oxidation potential. Yet another way to form the shell is to precipitate the shells on the surface by a chemical and/or electrochemical reaction.

Atomic Layer Deposition (ALD) is a versatile technique for producing thin, conformal coatings on a wide variety of surfaces and substrates. ALD was originally developed for the manufacturing of semiconductor devices as an alternative to other methods such as chemical vapor deposition (CVD) and physical vapor deposition (PVD). The operating principal is the sequential adsorption of reactant compounds onto an exposed substrate surface. The adsorption reaction is self-limiting and stops when a uniform surface layer completely coats the substrate. The introduction of the next reactant in the sequence both 1) reacts with the first reactant layer to form a uniform layer of the first atom in the compound to be coated, thus forming a new substrate surface, and 2) adsorption of a new layer composed of the next reactant layer. In this way, thin films with precisely controlled composition and thickness can be grown one atomic layer at a time. A wide variety of exemplary ALD reactants for forming a wide variety of compositions suitable for use as the thin materials disposed adjacent to the iron nitride nanoparticle cores are provide in the following table.

Table of ALD Reactants Suitable for Making Thin Material Disposed Adjacent to the Iron Nitride Nanoparticle Cores

| Thin Material | Reactant A | Reactant B | Reactant C |
|---|---|---|---|
| Al2O3 | $Al(O^iPr)_3$ | $H_2O$ | |
| | $Al(O^iPr)_3$ | $O_2$ plasma | |
| | $Al(O^iPr)_3$ | $H_2O$ plasma | |
| | $Al(^iPrAMD)Et_2$ | $H_2O$ | |
| | $Al(mmp)_3$ | $H_2O$ | |
| | $Al(NEt_2)_2(C_3H_6NMe_2)$ | $O_2$ plasma | |
| | $Al(NEt_2)_3$ | $H_2O$ | |
| | $Al(NEt_2)_3$ | $O_3$ | |
| | $Al(N^iPr_2)_2(C_3H_6NMe_2)$ | $H_2O$ | |
| | $Al(N^iPr_2)_3$ | $H_2O$ | |
| | $Al(NMe_2)_3$ | $H_2O$ | |
| | $Al(OEt)_3$ | $H_2O$ | |
| | $Al(OEt)_3$ | $O_2$ | |
| | $Al(O^nPr)_3$ | $H_2O$ | |
| | $Al(O^nPr)_3$ | $O_2$ | |
| | $Al(O^sBu)_3$ | $H_2O$ | |
| | $Al(O^sBu)_3$ | $O_2$ plasma | |
| | $Al(O^sBu)_3$ | $H_2O$ plasma | |
| | $AlCl_3$ | $H_2O$ | |
| | $AlCl_3$ | $H_2O$ + catalyst | |
| | $AlCl_3$ | $O_2$ | |
| | $AlCl_3$ | ROH | |
| | $AlCl_3$ | $Al(OEt)_3$ | |
| | $AlCl_3$ | $Al(O^iPr)_3$ | |
| | $AlCl_3$ | $O_3$ | |
| | $AlEt_3$ | $H_2O$ | |
| | $AlH_3N:(C_5H_{11})$ | $O_2$ plasma | |
| | $AlMe_2(C_3H_6NMe_2)$ | $O_2$ plasma | |
| | $AlMe_2Cl$ | $H_2O$ | |

-continued

Table of ALD Reactants Suitable for Making Thin Material
Disposed Adjacent to the Iron Nitride Nanoparticle Cores

| Thin Material | Reactant A | Reactant B | Reactant C |
|---|---|---|---|
| | $AlMe_2Cl$ | $O_3$ | |
| | $AlMe_2H$ | $O_2$ plasma | |
| | $AlMe_2O^iPr$ | $H_2O$ | |
| | $AlMe_2O^iPr$ | $O_2$ plasma | |
| | $AlMe_3$ | $H_2O$ | |
| | $AlMe_3$ | $H_2O$ photo assisted | |
| | $AlMe_3$ | $H_2O_2$ | |
| | $AlMe_3$ | $O_3$ | |
| | $AlMe_3$ | $O_2$ plasma | |
| | $AlMe_3$ | $O_2 + H_2O + H_2O_2$ | |
| | $AlMe_3$ | $CO_2$ plasma | |
| | $AlMe_3$ | $H_2O$ | |
| | $AlMe_3$ | $NO_2$ | |
| | $AlMe_3$ | $N_2O_4$ | |
| | $AlMe_3$ | $^iPrOH$ | |
| | $AlMe_3$ | $^nPrOH$ | |
| | $AlMe_3$ | $Al(O^iPr)_3$ | |
| Cu | $[Cu(^iPrAMD)]_2$ | $H_2$ | |
| | $[Cu(^iPrAMD)]_2$ | $H_2$ plasma | |
| | $[Cu(^sBuAMD)]_2$ | $H_2$ | |
| | $Cu(acac)_2$ | $H_2$ | |
| | $Cu(acac)_2$ | $H_2$ plasma | |
| | $Cu(acac)_2$ | $H_2O$ | $C_6H_4(OH)_2$ |
| | $Cu(dki)(vtms)$ | $SiH_2Et_2$ | |
| | $Cu(dmamb)_2$ | $H_2$ plasma | |
| | $Cu(dmap)_2$ | $ZnEt_2$ | |
| | $Cu(dmap)_2$ | $BH_3(NHMe_2)$ | |
| | $Cu(dmap)_2$ | $HCOOH$ | $BH_3(NHMe_2)$ |
| | $Cu(dmap)_2$ | $HCOOH$ | $H2NNH2$ |
| | $Cu(dmap)_2$ | $^tBuNHNH_2$ | |
| | $Cu(hfac)(vtmos)$ | $H_2$ plasma | |
| | $Cu(hfac)_2$ | $ROH$ | |
| | $Cu(hfac)_2$ | $HCHO$ | |
| | $Cu(hfac)_2$ | $H_2$ + catalyst | |
| | $Cu(hfac)_2$ | $ZnEt2$ | |
| | $Cu(^iPr_2NHC)(N(SiMe_3)_2)$ | $H_2$ plasma | |
| | $Cu(^iPr_2NHC)(N(SiMe_3)_2)$ | $H_2$ | |
| | $Cu(thd)_2$ | $H_2$ | |
| | $Cu(thd)_2$ | $H_2$ plasma | |
| | $CuCl$ | $H_2$ | |
| | $CuCl$ | $H_2 + H_2O$ | |
| | $CuCl$ | $Zn$ | |
| FeOx | $Fe(_{24}-C_7H1_1)_2$ | $O_3$ | |
| | $Fe(_{24}-C_7Hl_1)_2$ | $H_2O_2$ | |
| | $Fe(acac)_3$ | $O_2$ | |
| | $Fe(acac)_3$ | $O_3$ | |
| | $Fe(Cp)_2$ | $O_2$ | |
| | $Fe(Cp)_2$ | $O_3$ | |
| | $Fe(hfac)_2(TMEDA)$ | $O_3$ | |
| | $Fe(ipki)_2$ | $H_2O$ | |
| | $Fe(N(SiMe_3)_2)_2$ | $H_2O_2$ | |
| | $Fe(^tBuAMD)_2$ | $H_2O$ | |
| | $Fe(thd)_3$ | $O_3$ | |
| | $Fe_2(^tBuO)_6$ | $H_2O$ | |
| | $FeCl_3$ | $H_2O$ | |
| | $FeCp(^tBuCp)$ | $O_2$ plasma | |
| ZnO | $[EtZn(damp)]_2$ | $H_2O_2$ | |
| | $Zn$ | $O_2$ | |
| | $Zn$ | $H_2O$ | |
| | $Zn(eeki)_2$ | $H_2O$ | |
| | $Zn(OAc)_2$ | $H_2O$ | |
| | $ZnCl_2$ | $O_2$ | |
| | $ZnEt_2$ | $H_2O$ | |
| | $ZnEt_2$ | $H_2O$ plasma | |
| | $ZnEt_2$ | $H_2O$ photo assisted | |
| | $ZnEt_2$ | $H_2O + NH_3$ | |
| | $ZnEt_2$ | $H_2O + NH_3 + O_2$ | |
| | $ZnEt_2$ | $H_2O_2$ | |
| | $ZnEt_2$ | $O_2$ | |
| | $ZnEt_2$ | $O_2$ plasma | |
| | $ZnEt_2$ | $O_3$ | |
| | $ZnEt_2$ | $N_2O$ | |
| | $ZnEt_2$ | $N_2O$ plasma | |
| | $ZnMe(O^iPr)$ | $H_2O$ | |

-continued

Table of ALD Reactants Suitable for Making Thin Material
Disposed Adjacent to the Iron Nitride Nanoparticle Cores

| Thin Material | Reactant A | Reactant B | Reactant C |
|---|---|---|---|
| | $ZnMe_2$ | $H_2O$ | |
| | $ZnMe_2$ | $O_2$ plasma | |
| $SiO_2$ | $(N^iPr_2)H_2Si—SiH_2(N^iPr_2)$ | $O_3$ | |
| | $MeOSi(NCO)_3$ | $H_2O_2$ | |
| | $Si(NCO)_4$ | $H_2O$ | |
| | $Si(NCO)_4$ | $NEt_3$ | |
| | $Si(OEt)_3((CH_2)_3NH_2)$ | $H_2O + O_3$ | |
| | $Si(OEt)_4$ | $O_2$ plasma | |
| | $Si(OEt)_4$ | $H_2O$ + catalyst | |
| | $Si(OMe)_4$ | $H_2O$ | |
| | $Si(OMe)_4$ | $H_2O + NH_3$ catalyst | |
| | $Si(OtPe)_3OH$ | $AlMe_3$ | |
| | $Si(\eta_2-((N^tBu)CMe_2CH_2(N^tBu)))$ | $O_2$ plasma | |
| | $Si_2Cl_6$ | $O_3$ | |
| | $SiCl_2H_2$ | $O_3$ | |
| | $SiCl_3H$ | $H_2O$ | |
| | $SiCl_4$ | $H_2O$ | |
| | $SiCl_4$ | $H_2O$ + catalyst | |
| | $SiCl_4$ | $NH_3$ | $H_2O$ |
| | $SiH(NMe_2)_3$ | $O_3$ | |
| | $SiH(NMe_2)_3$ | $H_2O$ | |
| | $SiH(NMe_2)_3$ | $H_2O_2$ | |
| | $SiH(NMe_2)_3$ | $O_2$ plasma | |
| | $SiH_2(NEt_2)_2$ | $O_2$ plasma | |
| | $SiH_2(NEt_2)_2$ | $O_3$ | |
| | $SiH_2(NH^tBu)_2$ | $O_2$ plasma | |
| | $SiH_2(NH^tBu)_2$ | $O_3$ | |
| | $SiH_2(NMe_2)_2$ | $O_3$ | |
| | $SiH_3(N^iPr_2)$ | $O_3$ | |
| | $SiH_3(N^sBu_2)$ | $O_3$ | |
| | $SiH_4$ | $N_2O$ plasma | |
| | $SiH_4$ | $CO_2$ plasma | |
| $TiO_2$ | $Ti(Cp)CHT$ | $O_3$ | |
| | $Ti(CpMe)(O^iPr)_3$ | $O_2$ plasma | |
| | $Ti(CpMe_5)(OMe)_3$ | $O_3$ | |
| | $Ti(CpMe_5)(OMe)_3$ | $O_2$ plasma | |
| | $Ti(EtCp)(NMe_2)_3$ | $O_3$ | |
| | $Ti(NEt_2)_4$ | $O_3$ | |
| | $Ti(NEt_2)_4$ | $H_2O$ | |
| | $Ti(NEt_2)_4$ | $O_2$ plasma | |
| | $Ti(NEtMe)_3(guan-NEtMe)$ | $H_2O$ | |
| | $Ti(NEtMe)_3(guan-NEtMe)$ | $O_3$ | |
| | $Ti(NMe_2)_3(CpMe)$ | $O_2$ plasma | |
| | $Ti(NMe_2)_3(CpN)$ | $O_2$ plasma | |
| | $Ti(NMe_2)_3(dmap)$ | $O_2$ plasma | |
| | $Ti(NMe_2)_3(guan-NMe_2)$ | $H_2O$ | |
| | $Ti(NMe_2)_3(guan-NMe_2)$ | $O_2$ plasma | |
| | $Ti(NMe_2)_4$ | $H_2O$ | |
| | $Ti(NMe_2)_4$ | $O_3$ | |
| | $Ti(NMe_2)_4$ | $H_2O$ plasma | |
| | $Ti(NMe_2)_4$ | $O_2$ plasma | |
| | $Ti(NMe_2)_4$ | Only one half cycle | |
| | $Ti(NMe_2)_4$ | $H_2O_2$ | |
| | $Ti(NMeEt)_4$ | $H_2O$ | |
| | $Ti(NMeEt)_4$ | $O_3$ | |
| | $Ti(OEt)_4$ | $H_2O$ | |
| | $Ti(OEt)_4$ | $H_2O_2$ | |
| | $Ti(O^iPr)_2(dmae)_2$ | $H_2O$ | |
| | $Ti(O^iPr)_2(NMe_2)_2$ | $O_3$ | |
| | $Ti(O^iPr)_2(NMe_2)_2$ | $H_2O$ | |
| | $Ti(O^iPr)_2(thd)_2$ | $H_2O$ | |
| | $Ti(O^iPr)_2(thd)_2$ | $O_3$ | |
| | $Ti(O^iPr)_3(^iPr_2AMD)$ | $O_3$ | |
| | $Ti(O^iPr)_3(^iPr_2AMD)$ | $H_2O$ | |
| | $Ti(O^iPr)_4$ | $H_2O$ | |
| | $Ti(O^iPr)_4$ | $H_2O$ plasma | |
| | $Ti(O^iPr)_4$ | $H_2O_2$ | |
| | $Ti(O^iPr)_4$ | $O_2$ | |
| | $Ti(O^iPr)_4$ | $O_2$ plasma | |
| | $Ti(O^iPr)_4$ | $O_2 + NH_3$ | |
| | $Ti(O^iPr)_4$ | $NH_3$ | |
| | $Ti(O^iPr)_4$ | $O_3$ | |
| | $Ti(O^iPr)_4$ | $N_2O$ plasma | |
| | $Ti(O^iPr)_4$ | $HCOOH$ | |

-continued

Table of ALD Reactants Suitable for Making Thin Material
Disposed Adjacent to the Iron Nitride Nanoparticle Cores

| Thin Material | Reactant A | Reactant B | Reactant C |
|---|---|---|---|
| | $Ti(O^iPr)_4$ | $CH_3COOH$ | |
| | $Ti(OMe)_4$ | $H_2O$ | |
| | $Ti(OMe)_4$ | $O_3$ | |
| | $Ti(O^tBu)_4$ | $O_3$ | |
| | $Ti(trhd)_2(O(CMe_2Et)_2$ | $H_2O$ | |
| | $TiCl_4$ | $H_2O$ | |
| | $TiCl_4$ | $H_2O_2$ | |
| | $TiCl_4$ | MeOH | |
| | $TiCl_4$ | $O_2$ plasma | |
| | $TiCl_4$ | $H_2O$ plasma | |
| | $TiCl_4$ | $O_3$ | |
| | $TiCp_2(({}^iPrN)_2C(NH^iPr))$ | Only one half cycle | |
| | $TiF_4$ | $H_2O$ | |
| | $TiI_4$ | $H_2O$ | |
| | $TiI_4$ | $H_2O_2$ | |
| | $TiI_4$ | $O_2$ | |
| $ZrO_2$ | $Zr(Cp)(^tBuDAD)(O^iPr)$ | $H_2O$ | |
| | $Zr(Cp)(^tBuDAD)(O^iPr)$ | $O_3$ | |
| | $Zr(Cp_2CMe_2)Me(OMe)$ | $O_3$ | |
| | $Zr(Cp_2CMe_2)Me_2$ | $O_3$ | |
| | $Zr(CpEt)(NMe_2)_3$ | $O_3$ | |
| | $Zr(CpMe)(NMe_2)_3$ | $O_3$ | |
| | $Zr(CpMe)_2Me(OMe)$ | $H_2O$ | |
| | $Zr(CpMe)_2Me(OMe)$ | $O_3$ | |
| | $Zr(CpMe)_2Me_2$ | $O_3$ | |
| | $Zr(CpMe)CHT$ | $O_3$ | |
| | $Zr(CpMe_2)_2Me(O^tBu)$ | $H_2O$ | |
| | $Zr(dmae)_4$ | $H_2O$ | |
| | $Zr(Me_5Cp)(TEA)$ | $H_2O$ | |
| | $Zr(Me_5Cp)(TEA)$ | $O_3$ | |
| | $Zr(MeAMD)_4$ | $H_2O$ | |
| | $Zr(MeCp)(TMEA)$ | $H_2O$ | |
| | $Zr(MeCp)(TMEA)$ | $O_3$ | |
| | $Zr(NEt_2)_4$ | $H_2O$ | |
| | $Zr(NEt_2)_4$ | $O_2$ | |
| | $Zr(NEt_2)_4$ | $O_2$ plasma | |
| | $Zr(NEtMe)_2(guan-NEtMe)_2$ | $H_2O$ | |
| | $Zr(NEtMe)_2(guan-NEtMe)_2$ | $O_3$ | |
| | $Zr(NEtMe)_3(guan-NEtMe)$ | $H_2O$ | |
| | $Zr(NEtMe)_3(guan-NEtMe)$ | $O_3$ | |
| | $Zr(NEtMe)_4$ | $H_2O$ | |
| | $Zr(NEtMe)_4$ | $O_3$ | |
| | $Zr(NEtMe)_4$ | $O_2$ plasma | |
| | $Zr(NEtMe)_4$ | $N_2O$ plasma | |
| | $Zr(NEtMe)_4$ | Only one half cycle | |
| | $Zr(NMe_2)_4$ | $H_2O$ | |
| | $Zr(O^iPr)_2(dmae)_2$ | $H_2O$ | |
| | $Zr(O^iPr)_4$ | $H_2O$ | |
| | $Zr(O^tBu)_2(dmae)_2$ | $H_2O$ | |
| | $Zr(O^tBu)_2(dmae)_2$ | $H_2$ plasma | |
| | $Zr(O^tBu)_4$ | $H_2O$ | |
| | $Zr(O^tBu)_4$ | $O_2$ | |
| | $Zr(O^tBu)_4$ | $O_2$ plasma | |
| | $Zr(O^tBu)_4$ | $N_2O$ | |
| | $Zr(O^tBu)_4$ | Ar plasma | |
| | $Zr(thd)_4$ | $O_3$ | |
| | $Zr[N(SiMe_3)_2]_2Cl_2$ | $H_2O$ | |
| | $ZrCl_4$ | $H_2O$ | |
| | $ZrCl_4$ | $H_2O_2$ | |
| | $ZrCl_4$ | $O_2$ | |
| | $ZrCl_4$ | $O_3$ | |
| | $ZrCp(NMe_2)_3$ | $O_3$ | |
| | $ZrCp(NMe_2)_3$ | $O_2$ plasma | |
| | $ZrCp_2Cl_2$ | $O_3$ | |
| | $ZrCp_2Me(OMe)$ | $O_3$ | |
| | $ZrCp_2Me_2$ | $H_2O$ | |
| | $ZrCp_2Me_2$ | $O_3$ | |
| | $ZrI_4$ | $H_2O$ | |
| | $ZrI_4$ | $H_2O_2$ | |
| CoO | $CoCl_2(TMEDA)$ | $H_2O$ | |
| NiO | $Ni(acac)_2$ | $O_2$ | |
| | $Ni(acac)_2$ | $O_3$ | |
| | $Ni(acac)_2(TMEDA)$ | $O_3$ | |
| | $Ni(apo)_2$ | $O_3$ | |

-continued

Table of ALD Reactants Suitable for Making Thin Material Disposed Adjacent to the Iron Nitride Nanoparticle Cores

| Thin Material | Reactant A | Reactant B | Reactant C |
|---|---|---|---|
| | Ni(CpEt)$_2$ | O$_3$ | |
| | Ni(dmamb)$_2$ | H$_2$O | |
| | Ni(dmamb)$_2$ | O$_3$ | |
| | Ni(dmamb)$_2$ | H$_2$O$_2$ | |
| | Ni(dmamp)$_2$ | H$_2$O | |
| | Ni(dmg)$_2$ | O$_3$ | |
| | Ni(MeCp)$_2$ | O$_2$ plasma | |
| | Ni($^t$Bu$_2$DAD)$_2$ | O$_3$ | |
| | Ni($^t$BuAMD)$_2$ | H$_2$O | |
| | Ni(thd)$_2$ | H$_2$O | |
| | Ni(thd)$_2$ | O$_3$ | |
| | NiCp$_2$ | H$_2$O | |
| | NiCp$_2$ | O$_3$ | |
| | NiCp$_2$ | O$_2$ plasma | |
| Mn | Cu(dmap)$_2$ | [Mn(Me$^t$BuCOCN$^t$Bu)$_2$]$_2$ | BH$_3$(NHMe$_2$) |
| Cr | Cr(Me$^t$BuCOCN$^t$Bu)$_2$ | BH$_3$(NHMe$_2$) | |
| AlN | Al(NEt$_2$)$_3$ | NH$_3$ | |
| | Al(NEt$_2$)$_3$ | N$_2$H$_4$ | |
| | Al(NMe$_2$)$_3$ | NH$_3$ | |
| | AlCl$_3$ | NH$_3$ | |
| | AlCl$_3$ | NH$_3$ + H$_2$ plasma | |
| | AlCl$_3$ | NH$_3$ plasma | |
| | AlEt$_3$ | NH$_3$ | |
| | AlMe$_3$ | NH$_3$ | |
| | AlMe$_3$ | NH$_3$ photo assisted | |
| | AlMe$_3$ | NH$_3$ + N$_2$ plasma | |
| | AlMe$_3$ | N$_2$ + H$_2$ plasma | |
| | AlMe$_3$ | H$_2$ plasma | NH$_3$ |
| | AlMe$_3$ | NH$_3$ plasma | |
| | Me$_2$EtN:AlH$_3$ | NH$_3$ | |
| | Me$_3$N:AlH$_3$ | NH$_3$ | |

Discrete powders and particles can also be used as a substrate in ALD coating processes. The use of a fluidized bed reaction vessel can enable the intimate mixing of the powders and the vaporized ALD reactants. Mechanical agitation, such as the use of a vibrator attached to the reaction vessel, can promote the fluidization of the particles. In this configuration, the fluidized bed reactor is filled with a batch of powder fluidized in a vertically flowing column of gas. The ALD reactants are sequentially introduced into the reactor, and a purging step is used to clear excess reactants when changing from one ALD reactant to the next in the sequence. The reactor vessel may be contained in a furnace that can heat the fluidized bed to the reaction temperature needed for ALD.

A fluidized bed reactor can be used to coat the surface of magnetic iron nanoparticles with a coating of aluminum oxide. The purpose of the aluminum oxide coating is to passivate the surface of the iron nanoparticle and inhibit the oxidation of the nanoparticle when they are exposed to air. Suitable ALD reactants include trimethylaluminum (TMA) and water (H2O). The TMA is the source of the Aluminum, and the H2O is the source of the oxygen in the aluminum oxide coating. Suitable ALD reaction temperatures can be at least 180° C. and multiple cycles of TMA+H2O ALD steps can be used to build up the Al2O3 shell on the iron nanoparticle core. The thickness of the aluminum oxide shell is ideally less than 5 nm.

Fluidized bed reactor vessels may also be used to convert iron oxide nanoparticles into iron nitride nanoparticles. A fluidized bed reactor can be configured to flow both H2 and NH3 gas through a fluidized bed of nanoparticles at elevated temperature. Suitable reactors can first reduce iron oxide nanoparticles into iron using flowing H2 at a temperature between 350° C. to 500° C. In the same reactor vessel, the iron nanoparticles can then be transformed into iron nitride nanoparticles using NH3 flowing at a temperature between 110° C. and 180° C. Iron nitride nanoparticles can then be cooled to room temperature and passivated by briefly flowing a mixture of N2 and air over the nanoparticles. The passivation process produces a layer of iron oxide on the surface of the nanoparticles that inhibits further oxidation. Suitable processes can produce iron nitride nanoparticles with a saturation magnetization >200 emu/g and a coercivity as high as 1,000 Oe.

Forming a thin material shell by exposing the iron nitride cores to an atmosphere with a controlled-oxidation potential may be accomplished by flowing a gaseous mixture of oxygen and an inert gas over the iron nitride cores. The exposure may happen immediately after nitriding. The inert gasses used in the mixture may include Helium, Argon, Nitrogen, or a mixture thereof. The volume fraction of Oxygen in the mixture may be 20% or less, preferably 5% or less. High gas flow rates and cryogenic gas temperature may be used to limit the shell thickness by transporting away the heat of reaction.

The nitriding and/or shell formation may be performed in a stationary or rotating reaction vessel. The rotating reaction vessel may be a tube, double cone, or another shape that facilitates mixing. The nitriding and/or shell formation may also be performed in a fluidized bed reactor.

The reaction vessel may be intermittently or continuously vibrated during the nitriding and/or shell formation process. Vibrating can improve mixing during the process.

A limitation of processing nanoparticles is the tendency to form agglomerates. In general, nanoparticle agglomerates reduce yield by preventing surface-mediated reactions to proceed to completion. In the case of permanent magnets, the agglomerates may reduce performance by preventing the manufacturing of magnetically anisotropic magnets.

Certain steps in the nitriding and/or shell formation process may benefit from control of the agglomerate size, size distribution, and/or bulk density. For example, the operation of fluidized bed reactors may only be practical if the agglomerates fall within a range of size and bulk density that enables fluidization.

Methods to deagglomerate and/or control agglomeration of nanoparticles include shear mixing, low energy milling, and ultrasonication. These methods may be used before, during, or after nitriding and/or shell formation.

It is further recognized that the properties of the finished permanent magnet may depend on the size distribution of the nanoparticle precursors. For this reason, it may be necessary to modify the nanoparticle size distribution before, during, or after the nitriding and/or shell formation steps.

Methods to control nanoparticle size distribution include filtration, sieving, and mechanical attrition. Filtration methods include magnetic separation, electrostatic separation, and centrifugal separation in a cyclone. Sieving methods include the use of screen and selectively and non-selectively permeably membranes. Mechanical attrition methods include ultrasonication, high-energy ball milling, and jet milling.

In another embodiment, the invention specifically is a structure that comprises a nanoparticle having a partial, incomplete or discontinuous shell surrounding a predominantly $\alpha''$-$Fe_{16}N_2$ core, and the related methods for making this structure. This type of nanoparticle shell layer will hereafter be defined as a discontinuous shell. A discontinuous shell means there are portions of the surface of the core particle that are not covered by the shell material. By having a discontinuous shell, the nitriding process can occur after the shell is formed. This removes the constraint on the temperature used when forming the shell, thereby providing a new set of starting materials for producing bulk magnets comprising the $\alpha''$-$Fe_{16}N_2$ phase with improved magnetic properties.

In another embodiment, the invention specifically is a structure that comprises a nanoparticle having a substantially continuous shell layer that is comprised of a material that enables nitriding of Fe through that material, or is thin enough such that nitriding of Fe can proceed despite the presence of this material, and the related methods for making this structure. The shell material, the thickness of the shell material or both shell thickness and the material provide a means to enable nitriding after the shell material is provided. The shell thickness requirement may depend on the material, but could be approximately 1-3 atomic layers, or up to 3 nm, or thicker. Examples of materials that enable nitriding of Fe despite the presence of the include shell materials that have pinholes or porosity or intrinsically allow nitrogen (N) diffusion through the thin, solid shell. The diffusing species may be atomic N, $N_2$ molecules, $NH_3$ molecules or some intermediate configuration like an $(NH_4)+$ ion. Also, the diffusion may occur through the volume of the shell, or along the surfaces of the pinholes, or through the pinhole/discontinuities as a gas if the pinholes are large enough. More generally, the thin material forming the shell layer is configured such that mass transport of a nitrogen containing species via mechanisms may include volume and/or surface diffusion. The benefits are similar to the discontinuous shell structure—the nitriding step can occur after the shell is formed, again removing the temperature constraint from the temperature used when forming the shell.

In another embodiment, the invention is a structure that comprises the predominantly $\alpha''$-$Fe_{16}N_2$ core, a discontinuous first shell material, and a thin (<3 nm) continuous second shell material for making this structure. A second, thin, continuous shell material enables processing of the nanopowder with some exposure to oxygen-containing environment during the production process, which may simplify the production process. However, this second shell may have a negative effect on the saturation magnetization of the bulk, fully densified final magnet.

An additional benefit of any of these embodiments is realized at the time of densification and consolidation of the nanoparticles into a bulk magnet. For example, if the nanoparticle shell structure is comprised of a ductile metal such as Cu, Al, Sn, or Zn during the bulk magnet formation process using steps such as high shear deformation, the ductile metal shell regions on the individual nanoparticles may consolidate and join, forming a continuous or nearly continuous shell structure around the $\alpha''$-$Fe_{16}N_2$ phase in the nanoparticle core regions in the densified material. Without being bound by any theory of operation, it is believed that continuous or nearly continuous shells formed following consolidation will be comprised of a minimum amount of non-magnetic material and also may reduce or eliminate the volume of the bulk magnet comprised of a bonding agent, thereby maximizing the saturation magnetization of the material. The joined shell regions will also provide magnetic isolation enabling a single-domain or single-domain-like coercivity mechanism. Or, alternatively, if less discontinuous shell material is used in the pre-densification nanoparticle structure, a domain-wall-pinning coercivity mechanism may be realized following consolidation, with even higher saturation magnetization.

The various embodiments as described provide a means to nitride the iron core of the nanoparticles after the formation of the shell (continuous or discontinuous), so that the constraint on the processing temperature for formation of the shell structure is removed. This then enables formation of a shell structure, either continuous or discontinuous, that is composed of a material or materials that previously could not be used. The methods described herein allow materials such as certain oxides, like $Al_2O_3$, or nitrides like AlN or ductile metals, such as Cu, Al, Sn and Zn, or combinations of materials, or other materials with properties that further enhance the properties of the nanoparticles and/or the consolidated bulk magnet material.

EXAMPLES

Example 1

The starting materials for Example 1 were iron nitride nanoparticles prepared by reduction and nitriding of commercially procured $\gamma$-$Fe_2O_3$ nanoparticles in a 2" diameter rotary tube furnace. A total of 9 lots of nanoparticles, each lot approximately 1.2 grams in mass, were combined together to make the starting materials for the aluminum oxide coating operation. The $\gamma$-$Fe_2O_3$ nanoparticles were first transformed into $\alpha$-Fe nanoparticles by reduction in $H_2$ gas flowing at 200 sccm (standard cubic centimeters per minute) at 335° C. for 12 hours. The $\alpha$-Fe nanoparticles were subsequently transformed into iron nitride nanoparticles by flowing $NH_3$ gas at a rate of 60 sccm at 135° C. for 22 hours. The iron nitride nanoparticles were both unloaded and stored in a nitrogen filled glovebox. Phase analysis by X-Ray diffraction indicated that the iron nitride nanoparticles were a mixture of $\alpha''$-Fe$_{16}$N$_2$, $\epsilon$-Fe$_{2-3}$N, and $\alpha$-Fe. The majority of the phase fraction was $\alpha''$-Fe$_{16}$N$_2$.

The aluminum oxide coating was deposited by atomic layer deposition (ALD) conducted in a fluidized bed reactor vessel. The fluidized bed reaction vessel was loaded with 10 grams of iron nitride nanoparticles in a nitrogen (N2) filled glovebox. The reaction vessel was heated to 100° C. and the nanoparticle bed was fluidized in a flowing N2 carrier gas. The aluminum oxide coating was deposited one atomic layer at a time by alternately introducing vaporized trimethylaluminum (TMA) and water into the N2 carrier gas for a total of 9 cycles. Each cycle began with flowing TMA until the methane signal on a residual gas analyzer declined and the trimethylaluminum signal spiked, indicating that all surfaces in the reactor were coated with aluminum. The reactor vessel was purged with flowing N2 before flowing H$_2$O. The H$_2$O was flowed until the H$_2$O signal spiked, indicating that all surfaces in the reactor were coated with aluminum oxide. The reactor was again purged with flowing N2 prior to starting the next cycle.

The resulting aluminum oxide coated iron nitride nanoparticles were unloaded in air and their magnetic properties and microstructure were characterized. FIG. 1.1 shows a hysteresis loop of the coated nanoparticles. The intrinsic coercivity was measured to be 2,008 Oe and the saturation magnetization was measured to be 191 emu/gram. FIG. 1.2 is an X-Ray Diffraction pattern that shows that the coated nanoparticles are still a mixture of $\alpha''$-Fe$_{16}$N$_2$, $\epsilon$-Fe$_{2-3}$N, and $\alpha$-Fe phases. The major X-Ray diffraction peaks of each phase present in Example 1 are identified below in Table 1. Quantitative phase analysis by Mossbauer spectroscopy indicates that the mass fraction of the $\alpha$-Fe$_{16}$N$_2$ phase is 74%.

TABLE 1

X-Ray diffraction peaks of each phase present in Example 1

| Phase | (hkl) | Angle (°2Θ) | Integrated Intensity |
|---|---|---|---|
| $\alpha$-Fe | (110) | 44.6 | 323.5 |
| | (200) | 64.9 | 79.4 |
| | (211) | 82.2 | 72.1 |
| | (220) | 98.7 | 33.9 |
| $\alpha''$-Fe$_{16}$N$_2$ | (202) | 42.7 | 569.3 |
| | (220) | 44.8 | 313.9 |
| | (103) | 46 | 43.9 |
| | (213) | 56.7 | 36.5 |
| | (004) | 58.9 | 49.4 |
| | (400) | 65.3 | 79 |
| | (224) | 76.6 | 81 |
| | (422) | 81.2 | 195.6 |
| | (404) | 93.4 | 88.6 |
| | (440) | 99.4 | 26.5 |
| $\epsilon$-Fe$_{2-3}$N | (110) | 37.8 | 72.9 |
| | (002) | 41 | 61.6 |
| | (111) | 43.1 | 585.3 |
| | (302) | 82.7 | 106.7 |

High resolution transmission electron microscopy was performed to measure this thickness of the aluminum oxide coating on the surfaces of the iron nitride nanoparticles. FIG. 1.3 and FIG. 1.4 show the presence of a uniform coating on the nanoparticles with a thickness that ranges from 1.6 to 2.5 nm. Elemental maps were collected using energy dispersive X-Ray spectroscopy. FIG. 1.5 is an elemental map that shows that the aluminum signal is located on the surface on the nanoparticles. FIG. 1.6 and FIG. 1.7 show that the Fe and N signals, respectively, are located in the core of iron nitride nanoparticles. FIG. 1.8 is an image of the coated nanoparticles from which the elemental maps were collected.

An isotropic magnet was made from the aluminum-oxide coated iron nitride nanoparticles by uniaxial compaction. The nanoparticles were loaded into a 0.25" diameter cylindrical die and compacted in a hydraulic press. FIG. 1.9 is the hysteresis loop of a magnet compacted to a pressure of 10 MPa. This magnet has a saturation magnetization of 180 emu/gram and an intrinsic coercivity of 1,712 Oe. FIG. 1.10 is the hysteresis loop of a magnet compacted to a pressure of 12 MPa. This magnet has a saturation magnetization of 181 emu/gram and an intrinsic coercivity of 1,674 Oe.

Example 2

The starting materials for Example 2 were nine lots of iron nitride nanoparticles, each lot approximately 1.2 grams in mass, that were prepared in a rotary tube furnace by the same method described in Example 1. The atomic layer deposition parameters in Example 2 were also the same as Example 1, except for the fluidized bed temperature. The fluidized bed temperature in Example 2 was set to be 130° C. The hysteresis loop measured on the coated nanoparticles (FIG. 2.1) shows a saturation magnetization of 181 emu/gram and an intrinsic coercivity of 1,916 Oe. The X-Ray diffraction pattern again shows a mixture (FIG. 2.2) of $\alpha''$-Fe$_{16}$N$_2$, $\epsilon$-Fe$_{2-3}$N, and $\alpha$-Fe phases. The major X-Ray diffraction peaks of each phase present in Example 2 are identified below in Table 2. Mossbauer spectroscopy indicates that the mass fraction of the $\alpha$-Fe$_{16}$N$_2$ phase is 67%. The thickness of the aluminum oxide was measured to be 2.0-4.0 nm by high resolution transmission electron microscopy (FIG. 2.3 and FIG. 2.4). Elemental maps (FIG. 2.5, FIG. 2.6, FIG. 2.7, and FIG. 2.8) show Al on the surface and Fe and N in the core of the coated iron nitride nanoparticles.

TABLE 2

X-Ray diffraction peaks of each phase present in Example 2

| Phase | (hkl) | Angle (°2Θ) | Integrated Intensity |
|---|---|---|---|
| $\alpha$-Fe | (110) | 44.6 | 337.1 |
| | (200) | 64.9 | 65.1 |
| | (211) | 82.2 | 82.7 |
| | (220) | 98.7 | 21.7 |
| $\alpha''$-Fe$_{16}$N$_2$ | (202) | 42.7 | 906.5 |
| | (220) | 44.8 | 512 |
| | (103) | 46 | 64.2 |
| | (213) | 56.7 | 37.1 |
| | (004) | 58.9 | 89.3 |
| | (400) | 65.3 | 137.5 |
| | (224) | 76.6 | 123 |
| | (422) | 81.2 | 258.5 |
| | (404) | 93.4 | 89.6 |
| | (440) | 99.4 | 47.4 |
| $\epsilon$-Fe$_{2-3}$N | (110) | 37.8 | 21.2 |
| | (002) | 41 | 79.1 |
| | (111) | 43.1 | 631.8 |
| | (302) | 82.7 | 106.3 |

FIG. 2.9 is the hysteresis loop of a 0.25" diameter isotropic magnet uniaxially compacted to a pressure of 10 MPa. This magnet has a saturation magnetization of 183 emu/gram and an intrinsic coercivity of 1,617 Oe. FIG. 2.10 is the hysteresis loop of a magnet compacted to a pressure of 12 MPa. This magnet has a saturation magnetization of 180 emu/gram and an intrinsic coercivity of 1,566 Oe.

Example 3

The starting materials for Example 3 were commercially procured $\gamma$-Fe$_2$O$_3$ nanoparticles. Prior to being loaded into the fluidized bed reaction vessel, the γ-$Fe_2O_3$ nanoparticles were sieved and the 25 μm to 53 μm sieve fraction was retained. After loading into the fluidized bed reactor, the γ-$Fe_2O_3$ nanoparticles were transformed into α-Fe nanoparticles by reducing in $H_2$ gas flowing at 200 sccm at 315° C. for 15 hours. The α-Fe nanoparticles were then transformed into iron nitride nanoparticles by $NH_3$ gas flowing at 120 sccm at 135° C. for 40 hours. A coating of aluminum oxide was applied on the surface of the iron nitride nanoparticles by atomic layer deposition using 9 cycles of alternating trimethylaluminum and water at 100° C.

The hysteresis loop on the coated nanoparticles (FIG. 3.2) shows a saturation magnetization of 158 emu/gram and an intrinsic coercivity of 1,798 Oe. The X-Ray diffraction pattern (FIG. 3.2) shows a mixture of the desired of α"-$Fe_{16}N_2$, ε-$Fe_{2-3}N$, and α-Fe phases, as well as the presence of iron oxide that indicates that the γ-$Fe_2O_3$ nanoparticles were not completely transformed into α-Fe prior to nitriding. The major X-Ray diffraction peaks of each phase present in Example 3, except for the iron oxide phase, are identified below in Table 3. The thickness of the aluminum oxide was measured to be 1.9-3.6 nm by high resolution transmission electron microscopy (FIG. 3.3 and FIG. 3.4). Elemental maps (FIG. 3.5, FIG. 3.6, FIG. 3.7, and FIG. 3.8) show Al on the surface and Fe and N in the core of the coated iron nitride nanoparticles.

TABLE 3

X-Ray diffraction peaks of each phase present in Example 3.

| Phase | (hkl) | Angle (°2Θ) | Integrated Intensity |
|---|---|---|---|
| α-Fe | (110) | 44.6 | 323.5 |
| | (200) | 64.9 | 79.4 |
| | (211) | 82.2 | 72.1 |
| | (220) | 98.7 | 33.9 |
| α"-$Fe_{16}N_2$ | (202) | 42.7 | 569.3 |
| | (220) | 44.8 | 313.9 |
| | (103) | 46 | 43.9 |
| | (213) | 56.7 | 36.5 |
| | (004) | 58.9 | 49.4 |
| | (400) | 65.3 | 79 |
| | (224) | 76.6 | 81 |
| | (422) | 81.2 | 195.6 |
| | (404) | 93.4 | 88.6 |
| | (440) | 99.4 | 26.5 |
| ε-$Fe_{2-3}N$ | (110) | 37.8 | 72.9 |
| | (002) | 41 | 61.6 |
| | (111) | 43.1 | 585.3 |
| | (302) | 82.7 | 106.7 |

Example 4

The starting materials for Example 4 were commercially procured γ-$Fe_2O_3$ nanoparticles. The γ-$Fe_2O_3$ nanoparticles are supplied as a dry, agglomerated powder. The γ-$Fe_2O_3$ nanoparticle agglomerates have a typical size distribution between 1 and 500 μm. Prior to being loaded into the fluidized bed reaction vessel, the γ-$Fe_2O_3$ nanoparticles were sieved and the 25 μm to 53 μm sieve fraction was retained. After loading into the fluidized bed reactor, the γ-$Fe_2O_3$ nanoparticles were transformed into α-Fe nanoparticles by reducing in $H_2$ gas flowing at 200 sccm at 315° C. for 24 hours. The α-Fe nanoparticles were then transformed into iron nitride nanoparticles by $NH_3$ gas flowing at 120 sccm at 130° C. for 60 hours. A coating of aluminum oxide was applied on the surface of the iron nitride nanoparticles by atomic layer deposition using 9 cycles of alternating trimethylaluminum and water at 100° C.

The hysteresis loop on the coated nanoparticles (FIG. 4.2) shows a saturation magnetization of 151 emu/gram and an intrinsic coercivity of 1,756 Oe. The X-Ray diffraction pattern (FIG. 4.2) shows a mixture of the desired of α"-$Fe_{16}N_2$, ε-$Fe_{2-3}N$, and α-Fe phases. No peaks corresponding to iron oxide were observed in the X-Ray diffraction pattern. The major X-Ray diffraction peaks of each phase present in Example 4 are identified below in Table 4. The thickness of the aluminum oxide was measured to be 1.6-3.2 nm by high resolution transmission electron microscopy (FIG. 4.3 and FIG. 4.4). Elemental maps (FIG. 4.5, FIG. 4.6, FIG. 4.7, and FIG. 4.8) show Al on the surface and Fe and N in the core of the coated iron nitride nanoparticles.

TABLE 4

X-Ray diffraction peaks of each phase present in Example 4

| Phase | (hkl) | Angle (°2Θ) | Integrated Intensity |
|---|---|---|---|
| α-Fe | (110) | 44.6 | 58.6 |
| | (200) | 64.9 | 20.7 |
| | (211) | 82.2 | 14.2 |
| | (220) | 98.7 | 7.9 |
| α"-$Fe_{16}N_2$ | (202) | 42.7 | 357.2 |
| | (220) | 44.8 | 204.7 |
| | (103) | 46 | 21.7 |
| | (213) | 56.7 | 25.1 |
| | (004) | 58.9 | 56.3 |
| | (400) | 65.3 | 60.6 |
| | (224) | 76.6 | 54.8 |
| | (422) | 81.2 | 132 |
| | (404) | 93.4 | 53.5 |
| | (440) | 99.4 | 30.1 |
| ε-$Fe_{2-3}N$ | (110) | 37.8 | 0 |
| | (002) | 41 | 59.4 |
| | (111) | 43.1 | 662.4 |
| | (302) | 82.7 | 119.6 |

Example 5

The starting materials for Example 5 were iron nitride nanoparticles prepared by reduction and nitriding of commercially procured γ-$Fe_2O_3$ nanoparticles in a 2" diameter rotary tube furnace. A total of 27 lots of nanoparticles, each lot approximately 0.3 grams in mass, were combined together to make the starting materials for the aluminum oxide coating operation. The γ-$Fe_2O_3$ nanoparticles were first transformed into α-Fe nanoparticles by reduction in $H_2$ gas flowing at 100 sccm at 330° C. for 5 hours. The α-Fe nanoparticles were subsequently transformed into iron nitride nanoparticles by flowing $NH_3$ gas at a rate of 60 sccm at 135° C. for 22 hours. The iron nitride nanoparticles were both unloaded and stored in a nitrogen filled glovebox. Phase analysis by X-Ray diffraction indicated that the iron nitride nanoparticles were a mixture of α"-$Fe_{16}N_2$, ε-$Fe_{2-3}N$, and α-Fe. The majority of the phase fraction was α"-$Fe_{16}N_2$.

The fluidized bed reaction vessel was loaded with 10 grams of iron nitride nanoparticles in a N2 filled glovebox. A coating of aluminum oxide was applied on the surface of the iron nitride nanoparticles by atomic layer deposition using 9 cycles of alternating trimethylaluminum and water at 200° C. The coated nanoparticles were unloaded in air and characterized.

The hysteresis loop on the coated nanoparticles (FIG. 5.1) shows a saturation magnetization of 143 emu/gram and an intrinsic coercivity of 787 Oe. Phase analysis by X-Ray Diffraction (FIG. 5.2) indicated that the iron nitride nanoparticles were a mixture of α"-$Fe_{16}N_2$, ε-$Fe_{2-3}N$, α-Fe, and γ'-$Fe_4N$. The majority of the phase fraction was α-Fe. The major X-Ray diffraction peaks of each phase present in Example 5 are identified below in Table 5. Quantitative phase analysis by Mossbauer spectroscopy indicates that the mass fraction of the $\alpha$-$Fe_{16}N_2$ phase is 18%. These analyses show that a process temperature of 200° C. causes the $\alpha''$-$Fe_{16}N_2$ phase to decompose and transform into $\alpha$-Fe and $\epsilon$-$Fe_{2-3}N$. The decomposition of the $\alpha''$-$Fe_{16}N_2$ phase into the $\alpha$-Fe appears to cause the reduction in intrinsic coercivity of Example 5 relative to the other Examples.

TABLE 5

X-Ray diffraction peaks of each phase present in Example 5

| Phase | (hkl) | Angle (°2Θ) | Integrated Intensity |
|---|---|---|---|
| $\alpha$-Fe | (110) | 44.6 | 1136.4 |
|  | (200) | 64.9 | 132.2 |
|  | (211) | 82.2 | 337 |
|  | (220) | 98.7 | 118.7 |
| $\alpha''$-$Fe_{16}N_2$ | (202) | 42.7 | 546.7 |
|  | (220) | 44.8 | 375.7 |
|  | (103) | 46 | 85.4 |
|  | (213) | 56.7 | 0 |
|  | (004) | 58.9 | 10.5 |
|  | (400) | 65.3 | 82.3 |
|  | (224) | 76.6 | 57.6 |
|  | (422) | 81.2 | 155.9 |
|  | (404) | 93.4 | 13.8 |
|  | (440) | 99.4 | 34.6 |
| $\epsilon$-$Fe_{2-3}N$ | (110) | 37.8 | 44.1 |
|  | (002) | 41 | 95.7 |
|  | (111) | 43.1 | 203.4 |
|  | (302) | 82.7 | 73.7 |
| $\gamma'$-$Fe_4N$ | (111) | 41.1 | 437.9 |
|  | (200) | 47.9 | 272.8 |
|  | (220) | 70 | 124.8 |
|  | (311) | 84.6 | 142.8 |

High resolution transmission electron microscopy (FIG. 5.3 and FIG. 5.4) measured the thickness of the aluminum oxide coating to be 3.0-5.0 nm. An elemental map shows (FIG. 5.5) that Al is located on the on the surface of the nanoparticles. Elemental maps (FIG. 5.6 and FIG. 5.7) also show that Fe and N segregated within the nanoparticle core, further evidence of the decomposition of the $\alpha''$-$Fe_{16}N_2$ phase. FIG. 5.8 is an image of the coated nanoparticles from which the elemental maps were collected.

FIG. 5.9 is the hysteresis loop of a 0.25" diameter isotropic magnet uniaxially compacted to a pressure of 10 MPa. This magnet has a saturation magnetization of 150 emu/gram and an intrinsic coercivity of 681 Oe. FIG. 5.10 is the hysteresis loop of a magnet compacted to a pressure of 12 MPa. This magnet has a saturation magnetization of 148 emu/gram and an intrinsic coercivity of 677 Oe. The coercivity of the magnet is less than the coercivities of the magnets produced in Example 1 and Example 2 due to the decomposition of the $\alpha''$-$Fe_{16}N_2$ phase during the formation of the shell.

In view of these results, the plurality of nanoparticles as provided herein suitably are characterized has having an X-Ray diffraction pattern substantially similar to that depicted in FIG. 1.2, 2.2 or 3.2. In addition, X-Ray Diffraction peak intensity ratios can be used as a "fingerprint" of acceptable phase fraction of the nanoparticles provided herein. For example, the ratio of the integrated intensity of the $\alpha$-Fe (211) peak (at about 82.2 °2Θ) to the $\alpha''$-$Fe_{16}N_2$ (202) peak (at about 42.7 °2Θ) is desirably 0.20 or less, and more preferably 0.15 or less. The X-Ray diffractions patterns and diffraction angles provided herein are those measured when using an X-Ray source with a Cu target, configured to emit monochromatic Cu-Kα X-rays.

The particle size of the $\alpha''$-$Fe_{16}N_2$ phase (Core Thickness) for each nanoparticle was calculated using the Scherrer formula applied to the $\alpha''$-$Fe_{16}N_2$ X-Ray diffraction peak widths. The peak parameters were determined using the Rietveld refinement method that corrected for the instrumental broadening of the diffractometer. The Core Thicknesses are listed in Table 6.

A summary of the properties and characteristics of the aluminum oxide coated iron nitride nanoparticles made according to examples are provided below in Table 6.

TABLE 6

Properties of aluminum oxide coated iron nitride nanoparticles

| Nanoparticle Example No. | MSat (emu/g) | Hc, i (Oe) | $\alpha''$ fraction | Core Thickness | Shell Thickness |
|---|---|---|---|---|---|
| 1 | 191 | 2,008 | 74.09% | 27 nm | 1.6-2.5 nm |
| 2 | 181 | 1,916 | 67.21% | 26 nm | 2.0-4.0 nm |
| 3 | 158 | 1,798 | n/a | 21 nm | 1.9-3.6 nm |
| 4 | 151 | 1,756 | n/a | 20 nm | 1.6-3.2 nm |
| 5 | 143 | 787 | 18.1% | 19 nm | 3.0-5.0 nm |

A summary of the magnetic properties of isotropic magnets produced by uniaxial compaction of the aluminum oxide coated iron nitride nanoparticles are provided below in Table 7.

TABLE 7

Magnetic properties of isotropic magnets

| Magnet Example No. | Nanoparticle Ex. No. | Compaction Pressure (MPa) | MSat (emu/g) | Hc, i (Oe) |
|---|---|---|---|---|
| 6 | 1 | 10 | 180 | 1,712 |
| 7 | 1 | 12 | 181 | 1,674 |
| 8 | 2 | 10 | 183 | 1,617 |
| 9 | 2 | 12 | 180 | 1,566 |
| 10 | 5 | 10 | 150 | 681 |
| 11 | 5 | 12 | 148 | 677 |

A summary of the quantitative analysis of the phase mass fractions present in Examples 1, 2 and 5 determined by Mössbauer spectroscopy are provided below in Table 8.

TABLE 8

Phase mass fractions determined by Mössbauer spectroscopy

| Nanoparticle Example | $\alpha$-Fe Fraction | $\alpha''$-$Fe_{16}N_2$ Fraction | $\epsilon$-$Fe_{2-3}N$ Fraction | $\gamma'$-$Fe_4N$ Fraction |
|---|---|---|---|---|
| 1 | 10.04% | 74.09% | 15.88% | — |
| 2 | 10.55% | 67.21% | 22.24% | — |
| 5 | 36.29% | 14.26% | 28.22% | 21.22% |

When ranges are used herein for physical properties, such as molecular weight, or chemical properties, such as chemical formulae, all combinations, and subcombinations of ranges for specific embodiments therein are intended to be included.

The disclosures of each patent, patent application, and publication cited or described in this document are hereby incorporated herein by reference, in its entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

Clause 1. A plurality of iron-nitride nanoparticles, comprising:
an iron-based core, the iron-based core comprising 50% or more of α"-Fe16N2 phase in weight; and a thin material adjacently disposed on the iron-based core, wherein the thin material is configured to enable nitridation of the iron-based core.

Clause 2. The plurality of iron-nitride nanoparticles of Clause 1, wherein the thin material comprises a non-ferromagnetic material.

Clause 3. The plurality of iron-nitride nanoparticles of Clause 2, wherein the non-ferromagnetic material comprises FeO, α-Fe2O3, ZnO, Al2O3, SiO2, TiO2, ZrO2, CoO, NiO, Mn, Cr, CrN, MnN, Cu, Al, Sn, Zn, or any combination thereof.

Clause 4. The plurality of iron-nitride nanoparticles of Clause 1, wherein the thin material is configured as a discontinuous shell.

Clause 5. The plurality of iron-nitride nanoparticles of Clause 1, wherein the thin material is configured as substantially continuous shell capable of diffusing nitrogen.

Clause 6. The plurality of iron-nitride nanoparticles of Clause 1 characterized as having an Msat greater than about 145 emu/g and a coercivity greater than about 1,000 Oe.

Clause 7. The plurality of iron-nitride nanoparticles of Clause 1, wherein the α"-Fe16N2 phase mass fraction of the nanoparticles is characterized as being greater than 60% by Mössbauer spectroscopy.

Clause 8. A plurality of nanoparticles, comprising an iron nitride core and a non-ferromagnetic thin material disposed adjacent to the core, the nanoparticles characterized as comprising 50% or more of α"-Fe16N2 phase based on weight of the nanoparticles.

Clause 9. The plurality of nanoparticles of Clause 8, wherein the average thickness of the non-ferromagnetic thin material is less than 5 nm.

Clause 10. The plurality of nanoparticles of Clause 8, characterized as having a Msat greater than about 145 emu/g and a coercivity greater than about 1,000 Oe.

Clause 11. A plurality of nanoparticles, characterized with X-Ray diffraction using an X-Ray source with a Cu target configured to emit monochromatic Cu-Kα X-rays, the X-Ray diffraction giving rise to diffraction peaks wherein the ratio of the integrated intensity of the α-Fe (211) peak (at about 82.2 °2Θ) to the α"-Fe16N2 (202) peak (at about 42.7 °2Θ) is 0.2 or less.

Clause 12. A magnetic material, comprising: a plurality of iron-nitride nanophases characterized as comprising 50% or more of α"-Fe16N2 phase based on weight of the magnetic material, and non-ferromagnetic material disposed between the nanophases.

Clause 13. The magnetic material of Clause 12, wherein the non-ferromagnetic material disposed between the nanophases comprises FeO, α-Fe2O3, ZnO, Al2O3, SiO2, TiO2, ZrO2, CoO, NiO, Mn, Cr, CrN, MnN, Cu, Al, Sn, Zn, or any combination thereof.

Clause 14. The magnetic material of Clause 12, characterized as having an Msat greater than about 160 emu/g and a coercivity greater than about 700 Oe.

Clause 15. The magnetic material of Clause 12, wherein the thickness of the non-ferromagnetic material disposed between the nanophases has an average thickness less than 5 nm.

Clause 16. A plurality of iron nitride nanoparticles, comprising: an iron-based core, the iron-based core comprising 50% or more of α"-Fe16N2 phase in weight; and a shell on the iron-based core, wherein the shell comprises a material characterized as a ductile metal, a non-ferromagnetic material, or both.

Clause 17. The iron-nitride nanoparticle according to Clause 16, wherein the core has a major dimension in a range of from 20 nm to 200 nm.

Clause 18. The iron-nitride nanoparticle according to Clause 16, wherein the core has a major dimension in a range of from 40 nm to 80 nm.

Clause 19. The iron-nitride nanoparticle according to Clause 16, wherein a thickness of the shell is in a range of 0.1 nm to 5 nm.

Clause 20. The iron-nitride nanoparticle according to Clause 16, wherein a thickness of the shell is in a range of from 0.1 nm to 4 nm.

Clause 21. The iron-nitride nanoparticle according to Clause 16, wherein a thickness of the shell is 0.1 nm or larger and less than 3 nm.

Clause 22. The iron-nitride nanoparticle according to Clause 16, wherein the nanoparticle is spherical.

Clause 23. The iron-nitride nanoparticle according to Clause 16, wherein the nanoparticle is non-spherical.

Clause 24. The iron-nitride nanoparticle according to Clause 16, wherein the nanoparticle has a porous structure.

Clause 25. The iron-nitride nanoparticle according to Clause 16, wherein the nanoparticle is in a form of rod, needle, prolate ellipsoid, oblate ellipsoid, disk, and plate, foam, gel, or sponge.

Clause 26. The iron-nitride nanoparticle according to Clause 16, wherein the core further comprises one or more phases of α-Fe, α'-Fe8N, γ'-Fe4N, and ε-Fe2-3N.

Clause 27. The iron-nitride nanoparticle according to Clause 16, wherein the shell further comprises FeO, α-Fe2O3, ZnO, Al2O3, SiO2, TiO2, ZrO2, CoO, NiO, Mn, Cr, CrN, MnN, or any combination thereof.

Clause 28. The iron-nitride nanoparticle according to Clause 16, wherein the ductile metal comprises Cu Al, Sn, Zn, or any combination thereof.

Clause 29. A bulk magnet comprising a plurality of the iron-nitride nanoparticles of any of the preceding claims.

Clause 30. The bulk magnet according to Clause 29, wherein a saturation magnetization value (Msat) of the bulk magnet is 180 emu/g or higher.

Clause 31. The bulk magnet according to Clause 29, wherein a saturation magnetization value (Msat) of the bulk magnet is 195 emu/g or higher.

Clause 32. The bulk magnet according to Clause 29, wherein a coercivity value (Hci) of the bulk magnet is 1500 Oe or higher.

REFERENCES

Ahvenniemi, E. et al., "Review Article: Recommended reading list of early publications on atomic layer deposition—Outcome of the "Virtual Project on the History of ALD,"" Journal of Vacuum Science & Technology A: Vacuum, Surfaces, and Films. Vol. 35, 2016, 010801.

King, D. M., et al. "Atomic layer deposition on particles using a fluidized bed reactor with in situ mass spectrometry," Surface & Coatings Technology, Vol. 201, 2007, pp 9163-71.

L. F. Hakim, L. F., et al., "Synthesis of oxidation-resident metal nanoparticles via atomic layer deposition," Nanotechnology, Vol. 18, (2007), 354093.

Sankar, et al., "Iron nitride powders for use in magnetic, electromagnetic, and microelectronic devices," U.S. Pat. No. 8,535,634 B2, Sep. 17, 2013.

What is claimed is:

1. A plurality of iron-nitride nanoparticles, comprising:
   a. an iron-based core, the iron-based core comprising 50% or more of $\alpha''\text{-Fe}_{16}\text{N}_2$ phase in weight; and
   b. a thin material adjacently disposed on the iron-based core, wherein the thin material has an average thickness of 1 to 5 nm, wherein the thin material is characterized as a ductile metal;
   wherein the nanoparticles are characterized with X-Ray diffraction using an X-Ray source with a Cu target configured to emit monochromatic Cu-Kα X-rays, the X-Ray diffraction giving rise to diffraction peaks wherein the ratio of the integrated intensity of the α-Fe (211) peak (at about 82.2 °2Θ) to the $\alpha''\text{-Fe}_{16}\text{N}_2$ (202) peak (at about 42.7 °2Θ) is 0.2 or less;
   wherein the nanoparticles are characterized as having a saturation magnetization value ($M_{sat}$) greater than about 145 emu/g.

2. The plurality of iron-nitride nanoparticles of claim 1, wherein the thin material further comprises a non-ferromagnetic material.

3. The plurality of iron-nitride nanoparticles of claim 2, wherein the non-ferromagnetic material comprises FeO, α-Fe2O3, ZnO, Al2O3, SiO2, TiO2, ZrO2, CoO, NiO, Mn, Cr, CrN, MnN, Cu, Al, Sn, Zn, or any combination thereof.

4. The plurality of iron-nitride nanoparticles of claim 1 characterized as having a coercivity value ($H_{ci}$) greater than about 1,000 Oe.

5. The plurality of nanoparticles of claim 1, wherein the average thickness of the thin material is from 1 nm to 3 nm.

6. The plurality of iron-nitride nanoparticles of claim 1, wherein the thin material is a shell on the iron-based core.

7. The plurality of iron-nitride nanoparticle according to claim 6, wherein the core has a major dimension in a range of from 20 nm to 200 nm.

8. The plurality of iron-nitride nanoparticle according to claim 6, wherein the ductile metal comprises Cu Al, Sn, Zn, or any combination thereof.

9. A bulk magnet comprising a plurality of the iron-nitride nanoparticles of claim 1.

10. The bulk magnet according to claim 9, wherein a saturation magnetization value ($M_{sat}$) of the bulk magnet is 180 emu/g or higher.

11. The bulk magnet according to claim 9, wherein a coercivity value ($H_{ci}$) of the bulk magnet is 1500 Oe or higher.

12. A magnetic material, comprising:
   a. a plurality of iron-nitride nanophases characterized as comprising 50% or more of $\alpha''\text{-Fe}_{16}\text{N}_2$ phase based on weight of the magnetic material, and b. ductile metal disposed between the nanophases, wherein the ductile metal has an average thickness of 1 to 5 nm;
   wherein the magnetic material is characterized with X-Ray diffraction using an X-Ray source with a Cu target configured to emit monochromatic Cu-Kα X-rays, the X-Ray diffraction giving rise to diffraction peaks wherein the ratio of the integrated intensity of the α-Fe (211) peak (at about 82.2 °2Θ) to the $\alpha''$-Fe16N2 (202) peak (at about 42.7 °2Θ) is 0.2 or less;
   wherein the magnetic material is characterized as having a saturation magnetization value ($M_{sat}$) greater than about 145 emu/g.

13. The magnetic material of claim 12, further comprising non-ferromagnetic material disposed between the nanophases comprises FeO, α-Fe2O3, ZnO, Al2O3, SiO2, TiO2, ZrO2, CoO, NiO, Mn, Cr, CrN, MnN, Cu, Al, Sn, Zn, or any combination thereof.

14. The magnetic material of claim 12, wherein the ductile metal comprises Cu Al, Sn, Zn, or any combination thereof.

* * * * *